United States Patent
Hoffberg

(10) Patent No.: US 8,144,619 B2
(45) Date of Patent: Mar. 27, 2012

(54) MULTIFACTORIAL OPTIMIZATION SYSTEM AND METHOD

(76) Inventor: Steven M. Hoffberg, West Harrison, NY (US)

( * ) Notice: Subject to any disclaimer, the term of this patent is extended or adjusted under 35 U.S.C. 154(b) by 493 days.

(21) Appl. No.: 12/089,277

(22) PCT Filed: Oct. 3, 2006

(86) PCT No.: PCT/US2006/038759
§ 371 (c)(1),
(2), (4) Date: Apr. 4, 2008

(87) PCT Pub. No.: WO2007/044383
PCT Pub. Date: Apr. 19, 2007

(65) Prior Publication Data
US 2008/0262893 A1    Oct. 23, 2008

Related U.S. Application Data

(60) Provisional application No. 60/723,339, filed on Oct. 4, 2005.

(51) Int. Cl.
*H04L 12/28* (2006.01)
(52) U.S. Cl. ........ 370/254; 370/216; 370/391; 370/392; 370/400; 370/437; 370/465; 705/7; 705/8; 705/9; 705/26; 705/37; 705/80
(58) Field of Classification Search .......... None
See application file for complete search history.

(56) References Cited

U.S. PATENT DOCUMENTS

| | | | | |
|---|---|---|---|---|
| 6,556,548 | B1 * | 4/2003 | Kirkby et al. | 370/322 |
| 7,264,069 | B2 * | 9/2007 | Fiorenza et al. | 180/54.1 |
| 2002/0082856 | A1 * | 6/2002 | Gray et al. | 705/1 |
| 2004/0111308 | A1 * | 6/2004 | Yakov | 705/8 |
| 2004/0236817 | A1 * | 11/2004 | Huberman et al. | 709/200 |

OTHER PUBLICATIONS

Hoffberg, "Control of Ad Hoc Networks using Game Theory", Mar. 8, 2004.*
Fattahi et al., "New Economic Perspectives for Resource Allocation in Wireless Networks", Jun. 2005.*
Srivastava et al., "Using Game Theory to Analyze Wireless Ad Hoc Networks", 2005.*

* cited by examiner

*Primary Examiner* — Jason Mattis
*Assistant Examiner* — Aixa A Guadalupe
(74) *Attorney, Agent, or Firm* — Steven M. Hoffberg; Ostrolenk Faber LLP

(57) ABSTRACT

A method for providing unequal allocation of rights among agents while operating according to fair principles, comprising assigning a hierarchal rank to each agent; providing a synthetic economic value to a first set of agents at the a high level of the hierarchy; allocating portions of the synthetic economic value by the first set of agents to a second set of agents at respectively different hierarchal rank than the first set of agents; and conducting an auction amongst agents using the synthetic economic value as the currency. A method for allocation among agents, comprising assigning a wealth generation function for generating future wealth to each of a plurality of agents, communicating subjective market information between agents, and transferring wealth generated by the secure wealth generation function between agents in consideration of a market transaction. The method may further comprise the step of transferring at least a portion of the wealth generation function between agents.

19 Claims, 2 Drawing Sheets

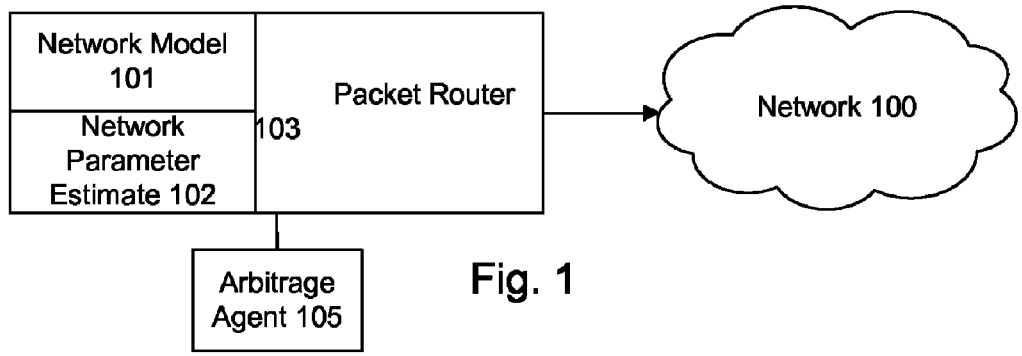

Fig. 1

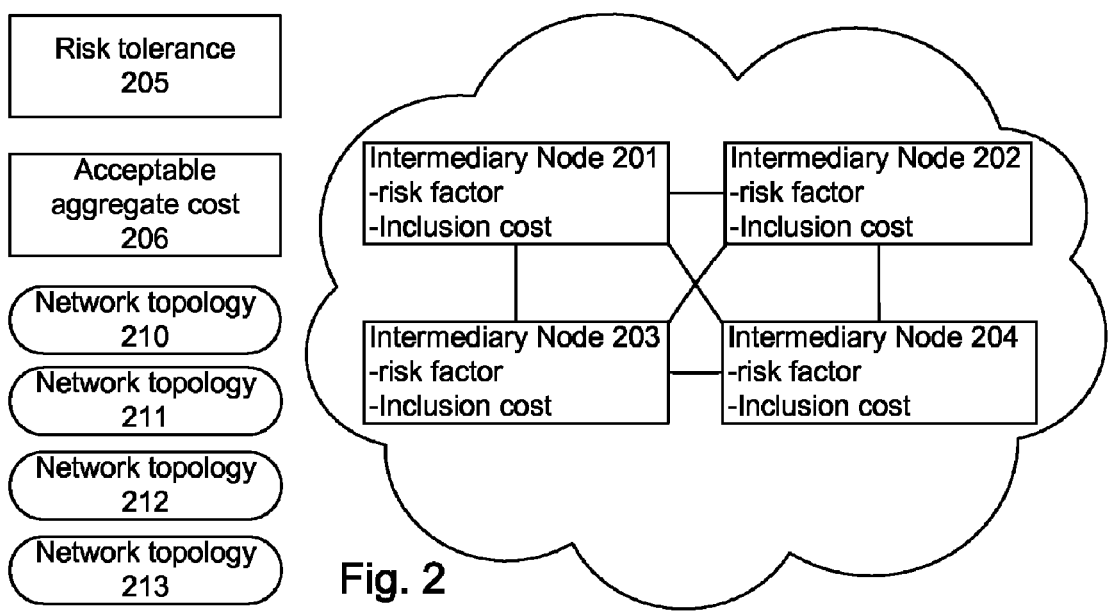

Fig. 2

| Define source node, destination node, first intermediate node and second intermediate node 301 |
|---|
| Estimate Network State at Intermediate Node 302 |
| Arbitrage Risk with arbitrage agent 303 |
| Communicate between source and destination 304 |
| Compensate intermediate nodes and arbitrage agent 305 |

Fig. 3

| Define set of prevailing parties and transaction price 401 |
|---|
| Define economic surplus from transaction 402 |
| Distribute portion of economic surplus to auction participants other than prevailing parties 403 |

Fig. 4

MULTIFACTORIAL OPTIMIZATION SYSTEM AND METHOD

FIELD OF THE INVENTION

The present invention relates to the field of multifactorial economic optimization, and more generally to optimization of communities of elements having conflicting requirements and overlapping resources.

BACKGROUND OF THE INVENTION

In modern retail transactions, predetermined price transactions are common, with market transactions, i.e., commerce conducted in a setting which allows the transaction price to float based on the respective valuation allocated by the buyer(s) and seller(s), often left to specialized fields. While interpersonal negotiation is often used to set a transfer price, this price is often different from a transfer price that might result from a best-efforts attempt at establishing a market price. Assuming that the market price is optimal, it is therefore assumed that alternatives are sub-optimal. Therefore, the establishment of a market price is desirable over simple negotiations.

One particular problem with market-based commerce is that both seller optimization and market efficiency depend on the fact that representative participants of a preselected class are invited to participate, and are able to promptly communicate, on a relevant timescale, in order to accurately value the goods or services and make an offer. Thus, in traditional market-based system, all participants are in the same room, or connected by a high quality (low latency, low error) telecommunications link. Alternately, the market valuation process is prolonged over an extended period, allowing non-real time communications of market information and bids. Thus, attempts at ascertaining a market price for non-commodity goods can be subject to substantial inefficiencies, which reduce any potential gains by market pricing. Further, while market pricing might be considered "fair", it also imposes an element of risk, reducing the ability of parties to predict future pricing and revenues. Addressing this risk may also improve efficiency of a market-based system, that is, increase the overall surplus in the market.

When a single party seeks to sell goods to the highest valued purchaser(s), to establish a market price, the rules of conduct typically define an auction. Typically, known auctions provide an ascending price or descending price over time, with bidders making offers or ceasing to make offers, in the descending price or ascending price models, respectively, to define the market price. After determining the winner of the auction, typically a bidder who establishes a largest economic surplus, the pricing rules define the payment, which may be in accordance with a uniform price auction, wherein all successful bidders pay the lowest successful bid, a second price auction wherein the winning bidder pays the amount bid by the next highest bidder, and pay-what-you-bid (first price) auctions. The pay-what-you-bid auction is also known as a discriminative auction while the uniform price auction is known as a non-discriminative auction. In a second-price auction, also known as a Vickrey auction, the policy seeks to create a disincentive for speculation and to encourage bidders to submit bids reflecting their true value for the good, rather than "shaving" the bid to achieve a lower cost. In the uniform price and second price schemes, the bidder is encourages to disclose the actual private value to the bidder of the good or service, since at any price below this amount, there is an excess gain to the buyer, whereas by withholding this amount the bid may be unsuccessful, resulting in a loss of the presumably desirable opportunity. In the pay-what-you-bid auction, on the other hand, the buyer need not disclose the maximum private valuation, and those bidders with lower risk tolerance will bid higher prices. See, ww.isoc.org/inet98/proceedings/3b/3b_3.html; www.ibm.com/iac/reports-technical/reports-bus-neg-internet.html.

Two common types of auction are the English auction, which sells a single good to the highest bidder in an ascending price auction, and the Dutch auction, in which multiple units are available for sale, and in which a starting price is selected by the auctioneer, which is successively reduced, until the supply is exhausted by bidders (or the minimum price/final time is reached), with the buyer(s) paying the lowest successful bid. The term Dutch auction is also applied to a type of sealed bid auction. In a multi-unit live Dutch auction, each participant is provided with the current price, the quantity on hand and the time remaining in the auction. This type of auction, typically takes place over a very short period of time and there is a flurry of activity in the last portion of the auction process. The actual auction terminates when there is no more product to be sold or the time period expires.

In selecting the optimal type of auction, a number of factors are considered. In order to sell large quantities of a perishable commodity in a short period of time, the descending price auctions are often preferred. For example, the produce and flower markets in Holland routinely use the Dutch auction (hence the derivation of the name), while the U.S. Government uses this form to sell its financial instruments. The format of a traditional Dutch auction encourages early bidders to bid up to their "private value", hoping to pay some price below the "private value". In making a bid, the "private value" becomes known, helping to establish a published market value and demand curve for the goods, thus allowing both buyers and sellers to define strategies for future auctions.

In an auction, typically a seller retains an auctioneer to conduct an auction with multiple buyers. (In a reverse auction, a buyer solicits the lowest price from multiple competing vendors for a desired purchase). Since the seller retains the auctioneer, the seller essentially defines the rules of the auction. These rules are typically defined to maximize the revenues or profit to the seller, while providing an inviting forum to encourage a maximum number of high valued buyers. If the rules discourage high valuations of the goods or services, or discourage participation by an important set of potential bidders, then the rules are not optimum. Rules may also be imposed to discourage bidders who are unlikely to submit winning bids from consuming resources. A rule may also be imposed to account for the valuation of the good or service applied by the seller, in the form of a reserve price. It is noted that these rules typically seek to allocate to the seller a portion of the economic benefit that would normally inure to the buyer (in a perfectly efficient auction), creating an economic inefficiency. However, since the auction is to benefit the seller, not society as a whole, this potential inefficiency is tolerated. An optimum auction thus seeks to produce a maximum profit (or net revenues) for the seller. An efficient auction, on the other hand, maximizes the sum of he utilities for the buyer and seller. It remains a subject of academic debate as to which auction rules are most optimum in given circumstances; however, in practice, simplicity of implementation may be a paramount concern, and simple auctions may result in highest revenues; complex auctions, while theoretically more optimal, may discourage bidders from participating or from applying their true and full private valuation in the auction process.

Typically, the rules of the auction are predefined and invariant. Further, for a number of reasons, auctions typically apply the same rules to all bidders, even though, with a priori knowledge of the private values assigned by each bidder to the goods, or a prediction of the private value, an optimization rule may be applied to extract the full value assigned by each bidder, while selling above the seller's reserve.

In a known ascending price auction, each participant must be made aware of the status of the auction, e.g., open, closed, and the contemporaneous price. A bid is indicated by the identification of the bidder at the contemporaneous price, or occasionally at any price above the minimum bid increment plus the previous price. The bids are asynchronous, and therefore each bidder must be immediately informed of the particulars of each bid by other bidders.

In a known descending price auction, the process traditionally entails a common clock, which corresponds to a decrementing price at each decrement interval, with an ending time (and price). Therefore, once each participant is made aware of the auction parameters, e.g., starting price, price decrement, ending price/time, before the start of the auction, the only information that must be transmitted is auction status (e.g., inventory remaining).

As stated above, an auction is traditionally considered an efficient manner of liquidating goods at a market price. The theory of an auction is that either the buyer will not resell, and thus has an internal or private valuation of the goods regardless of other's perceived values, or that the winner will resell, either to gain economic efficiency or as a part of the buyer's regular business. In the later case, it is a general presumption that the resale buyers are not in attendance at the auction or are otherwise precluded from bidding, and therefore that, after the auction, there will remain demand for the goods at a price in excess of the price paid during the auction. Extinction of this residual demand results in the so-called "winner's curse", in which the buyer can make no profit from the transaction during the auction. Since this detracts from the value of the auction as a means of conducting profitable commerce, it is of concern to both buyer and seller.

Research into auction theory (game theory) shows that in an auction, the goal of the seller is to optimize the auction by allocating the goods inefficiently, if possible, and thus to appropriate to himself an excess gain. This inefficiency manifests itself by either withholding goods from the market or placing the goods in the wrong hands. In order to assure for the seller a maximum gain from a misallocation of the goods, restrictions on resale are imposed; otherwise, post auction trading will tend to undue the misallocation, and the anticipation of this trading will tend to control the auction pricing. The misallocations of goods imposed by the seller through restrictions allow the seller to achieve greater revenues than if free resale were permitted. It is believed that in an auction followed by perfect resale, that any mis-assignment of the goods lowers the seller's revenues below the optimum and likewise, in an auction market followed by perfect resale, it is optimal for the seller to allocate the goods to those with the highest value. Therefore, if post-auction trading is permitted, the seller will not benefit from these later gains, and the seller will obtain sub optimal revenues.

These studies, however, typically do not consider transaction costs and internal inefficiencies of the resellers, as well as the possibility of multiple classes of purchasers, or even multiple channels of distribution, which may be subject to varying controls or restrictions, and thus in a real market, such theoretical optimal allocation is unlikely. In fact, in real markets the transaction costs involved in transfer of ownership are often critical in determining a method of sale and distribution of goods. For example, it is the efficiency of sale that motivates the auction in the first place. Yet, the auction process itself may consume a substantial margin, for example 1-15% of the transaction value. To presume, even without externally imposed restrictions on resale, that all of the efficiencies of the market may be extracted by free reallocation, ignores that the motivation of the buyer is a profitable transaction, and the buyer may have fixed and variable costs on the order of magnitude of the margin. Thus, there are substantial opportunities for the seller to gain enhanced revenues by defining rules of the auction, strategically allocating inventory amount and setting reserve pricing.

Therefore, perfect resale is but a fiction created in auction (game) theory. Given this deviation from the ideal presumptions, auction theory may be interpreted to provide the seller with a motivation to misallocate or withhold based on the deviation of practice from theory, likely based on the respective transaction costs, seller's utility of the goods, and other factors not considered by the simple analyses.

In many instances, psychology plays an important role in the conduct of the auction. In a live auction, bidders can see each other, and judge the tempo of the auction. In addition, multiple auctions are often conducted sequentially, so that each bidder can begin to understand the other bidder's patterns, including hesitation, bluffing, facial gestures or mannerisms. Thus, bidders often prefer live auctions to remote or automated auctions if the bidding is to be conducted strategically.

Internet auctions are quite different from live auctions with respect to psychological factors. Live auctions are often monitored closely by bidders, who strategically make bids, based not only on the "value" of the goods, but also on an assessment of the competition, timing, psychology, and progress of the auction. It is for this reason that so-called proxy bidding, wherein the bidder creates a preprogrammed "strategy", usually limited to a maximum price, are disfavored as a means to minimize purchase price, and offered as a service by auctioneers who stand to make a profit based on the transaction price. A maximum price proxy bidding system is somewhat inefficient, in that other bidders may test the proxy, seeking to increase the bid price, without actually intending to purchase, or contrarily, after testing the proxy, a bidder might give up, even below a price he might have been willing to pay. Thus, the proxy imposes inefficiency in the system that effectively increases the transaction cost.

In order to address a flurry of activity that often occurs at the end of an auction, an auction may be held open until no further bids are cleared for a period of time, even if advertised to end at a certain time. This is common to both live and automated auctions. However, this lack of determinism may upset coordinated schedules, thus impairing efficient business use of the auction system.

Game Theory

Use of Game Theory to control arbitration of ad hoc networks is well known. F. P. Kelly, A. Maulloo, and D. Tan. Rate control in communication networks: shadow prices, proportional fairness and stability. Journal of the Operational Research Society, 49, 1998. citeseer.ist.psu.edu/kelly98rate.html; J. MacKie-Mason and H. Varian. Pricing congestible network resources. IEEE Journal on Selected Areas in Communications, 13(7):1141-1149, 1995. Some prior studies have focused on the incremental cost to each node for participation in the network, without addressing the opportunity cost of a node foregoing control over the communication medium. Courcoubetis, C., Siris, V. A. and Stamoulis, G. D. Integration of pricing and flow control for available bit rate services in ATM networks. In Proceedings IEEE Globecom '96, pp. 644-648. London, UK. citeseer.ist.psu.edu/courcoubetis96integration.html.

A game theoretic approach addresses the situation where the operation of an agent which has freedom of choice, allowing optimization on a high level, considering the possibility of alternatives to a well designed system. According to game theory, the best way to ensure that a system retains compliant agents is to provide the greatest anticipated benefit, at the least anticipated cost, compared to the alternates.

Game Theory provides a basis for understanding the actions of Ad hoc network nodes. A multihop ad hoc network requires a communication to be passed through a disinterested node. The disinterested node incurs some cost, thus leading to a disincentive to cooperate. Meanwhile, bystander nodes must defer their own communications in order to avoid interference, especially in highly loaded networks. By understanding the decision analysis of the various nodes in a network, it is possible to optimize a system which, in accordance with game theory, provides benefits or incentives, to promote network reliability and stability. The incentive, in economic form, may be charged to those benefiting from the communication, and is preferably related to the value of the benefit received. The proposed network optimization scheme employs a modified combinatorial (VCG) auction, which optimally compensates those involved in the communication, with the benefiting party paying the second highest bid price (second price). The surplus between the second price and VCG price is distributed among those who defer to the winning bidder according to respective bid value. Equilibrium usage and headroom may be influenced by deviating from a zero-sum condition. The mechanism seeks to define fairness in terms of market value, providing probable participation benefit for all nodes, leading to network stability.

An ad hoc network is a wireless network which does not require fixed infrastructure or centralized control. The terminals in the network cooperate and communicate with each other, in a self organizing network. In a multihop network, communications can extend beyond the scope of a single node, employing neighboring nodes to forward messages to their destination. In a mobile ad hoc network, constraints are not placed on the mobility of nodes, that is, they can relocate within a time scale which is short with respect to the communications, thus requiring consideration of dynamic changes in network architecture.

Ad hoc networks pose control issues with respect to contention, routing and information conveyance. There are typically tradeoffs involving equipment size, cost and complexity, protocol complexity, throughput efficiency, energy consumption, and "fairness" of access arbitration. Other factors may also come into play. L. Buttyan and J.-P. Hubaux. Rational exchange—a formal model based on game theory. In Proceedings of the 2nd International Workshop on Electronic Commerce (WELCOM), November 2001. citeseer.ist.psu.edu/an01rational.html; P. Michiardi and R. Molva. Game theoretic analysis of security in mobile ad hoc networks. Technical Report RR-02-070, Institut Eurécom, 2002; P. Michiardi and R. Molva. A game theoretical approach to evaluate cooperation enforcement mechanisms in mobile ad hoc networks. In Proceedings of WiOpt'03, March 2003; Michiardi, P., Molva, R.: Making greed work in mobile ad hoc networks. Technical report, Institut Eurecom (2002) citeseer.ist.psu.edu/michiardi02making.html; S. Shenker. Making greed work in networks: A game-theoretic analysis of switch service disciplines. IEEE/ACM Transactions on Networking, 3(6):819-831, December 1995; A. B. MacKenzie and S. B. Wicker. Selfish users in aloha: A game-theoretic approach. In Vehicular Technology Conference, 2001. VTC 2001 Fall. IEEE VTS 54th, volume 3, October 2001; J. Crowcroft, R. Gibbens, F. Kelly, and S. Östring. Modelling incentives for collaboration in mobile ad hoc networks. In Proceedings of WiOpt'03, 2003.

Game theory studies the interactions of multiple independent decision makers, each seeking to fulfill their own objectives. Game theory encompasses, for example, auction theory and strategic decision-making. By providing appropriate incentives, a group of independent actors may be persuaded, according to self-interest, to act toward the benefit of the group. That is, the selfish individual interests are aligned with the community interests. In this way, the community will be both efficient and the network of actors stable and predictable. Of course, any systems wherein the "incentives" impose too high a cost, themselves encourage circumvention. In this case, game theory also addresses this issue.

In computer networks, issues arise as the demand for communications bandwidth approaches the theoretical limit. Under such circumstances, the behavior of nodes will affect how close to the theoretical limit the system comes, and also which communications are permitted. The well known collision sense, multiple access (CSMA) protocol allows each node to request access to the network, essentially without cost or penalty, and regardless of the importance of the communication. While the protocol incurs relatively low overhead and may provide fully decentralized control, under congested network conditions, the system may exhibit instability, that is, a decline in throughput as demand increases, resulting in ever increasing demand on the system resources and decreasing throughput. Durga P. Satapathy and Jon M. Peha, Performance of Unlicensed Devices With a Spectrum Etiquette," Proceedings of IEEE Globecom, November 1997, pp. 414-418. citeseer.ist.psu.edu/satapathy97performance.html. According to game theory, the deficit of the CSMA protocol is that it is a dominant strategy to be selfish and hog resources, regardless of the cost to society, resulting in "the tragedy of the commons." Garrett Hardin. The Tragedy of the Commons. Science, 162:1243-1248, 1968. Alternate Location: dieoff.com/page95.htm.

In an ad hoc network used for conveying real-time information, as might be the case in a telematics system, there are potentially unlimited data communication requirements (e.g., video data), and network congestion is almost guaranteed. Therefore, using a CSMA protocol as the paradigm for basic information conveyance is destined for failure, unless there is a disincentive to network use. (In power constrained circumstances, this cost may itself provide such a disincentive). On the other hand, a system which provides more graceful degradation under high load, sensitivity to the importance of information to be communicated, and efficient utilization of the communications medium would appear more optimal.

One way to impose a cost which varies in dependence on the societal value of the good or service is to conduct an auction, which is a mechanism to determine the market value of the good or service, at least between the auction participants. Walsh, W. and M. Wellman (1998). A market protocol for decentralized task allocation, in "Proceedings of the Third International Conference on Multi-Agent Systems," pp. 325-332, IEEE Computer Society Press, Los Alamitos. In an auction, the bidder seeks to bid the lowest value, up to a value less than or equal to his own private value (the actual value which the bidder appraises the good or service, and above which there is no surplus), that will win the auction. Since competitive bidders can minimize the gains of another bidder by exploiting knowledge of the private value attached to the good or service by the bidder, it is generally a dominant strategy for the bidder to attempt to keep its private value a secret, at least until the auction is concluded, thus yielding strategies that result in the largest potential gain. On the other hand, in certain situations, release or publication of the private value is a dominant strategy, and can result in substantial efficiency, that is, honesty in reporting the private value results in the maximum likelihood of prospective gain.

SUMMARY AND OBJECTS OF THE INVENTION

The present invention provides a networking system comprising a network model, said model comprising a network parameter estimate; a packet router, routing packets in dependence on the model; and an arbitrage agent, to arbitrage a risk that said network parameter estimate is incorrect. The arbitrage agent typically operates with superior information or resources, such that its own estimate of the network at a relevant time is different than that produced by the network model, resulting in an arbitrage opportunity. In this case, arbitrage is not necessarily meant to indicate a risk-free gain, but rather a reduced risk potential gain.

The present invention also provides a method for routing a communication, comprising defining a set of available intermediary nodes, a plurality of members of the set being associated with a risk factor and an inclusion cost; defining an acceptable communications risk tolerance and an acceptable aggregate communications cost; defining a set of network topologies, each network topology employing a subset of members of the set of intermediary nodes, having a communications risk within the acceptable communications risk tolerance and a communications cost within the acceptable aggregate communications cost; and routing a communication using one of the set of network topologies. In according with this embodiment of the invention, alternate network topologies are available through the plurality of nodes, and the selection of a network topology is based not only on a potential efficiency of a topology, but also a risk with respect to that topology. Therefore, a less efficient topology with lower risk may be rationally selected based on a risk tolerance. In accordance with this embodiment, the method may further comprise the step of arbitraging a risk to increase a cost-benefit.

A further embodiment of the invention provides a method of routing a communication, comprising: defining a source node, a destination node, and at least two intermediate nodes; estimating a network state of at least one of the intermediate nodes; arbitraging a risk with respect to an accuracy of the estimate of network state with an arbitrage agent; communicating between said source and said destination; and compensating said at least two intermediate nodes and said agent.

A still further object of the invention is top provide method of optimizing relationships between a set of agents with respect to a set of allocable resources, comprising for a plurality of agents, determining at least one of a subjective resource value function, and a subjective risk tolerance value function; providing at least one resource allocation mechanism, wherein a resource may be allocated on behalf of an agent in exchange for value; providing at least one risk transference mechanism, wherein a risk may be transferred from one agent to another agent in exchange for value; selecting an optimal allocation of resources and assumption of risk by maximizing, within an error limit, an aggregate economic surplus of the putative organization of agents; accounting for the allocation of resources and allocation of risk in accordance with the subjective resource value function and a subjective risk tolerance value function for the selected optimal allocation; and allocating resources and risk in accordance with the selected optimal organization. The resource may comprises, for example, a communication opportunity. The agent may have a subjective resource value for failing to gain an allocation of a resource. Likewise, the agent may have an option or ability to defect from the organization. The agent may have a multipart resource requirement, wherein an optimal resource allocation requires allocation of a plurality of resource components. A risk transference agent may be provided to insure a risk. A risk transference agent may be provided to arbitrage a risk. A risk transference agent may be provided which speculatively acquires resources. The optimal resource allocation may comprise an explicit allocation of a first portion of component resources and an implicit allocation of a second portion of component resources, a risk transference agent undertaking to fulfill the second portion.

In accordance with a still further aspect of the invention, a method of optimizing an allocation of resources and deference from contesting the allocation of resources to other agents is provided, comprising: determining a subjective resource value function, and a subjective deference value function for an agent with respect to a resource allocation within a community; selecting an optimal allocation of resources and deference by maximizing, within an error limit, an aggregate economic surplus of the community; allocating resources in accordance with the selected optimal organization; and accounting in accordance with the subjective resource value function, and subjective deference value function. This deference value function thus quantifies in an economic function the deference of one agent to another.

The present invention further provides a method of optimizing an allocation of resources within members of a community, comprising: determining subjective resource value functions for a plurality of resources for members of the community; selecting an optimal allocation of resources, within an error limit, to maximize an aggregate economic surplus of the community; charging members of the community in accordance with the respective subjective resource value functions and member benefits; allocating at least a portion of the economic surplus resulting from the allocation to members who defer gaining a resource allocation benefit of the community. The invention further provides a method of encouraging recruitment of entities into an auction, comprising: defining a set of prevailing parties and a transaction price; defining an economic surplus from the transaction; and distributing a portion of the economic surplus to auction participants not within the set of prevailing parties, in relation to a magnitude of an offer. A further aspect of the invention provides a method for optimizing a market, comprising: recruiting at least four parties comprising at least one buyer, at least one seller, and at least one deferring party; matching bidders with offerors to maximize a surplus; and allocating the surplus at least in part to the deferring party, to motivate deference. In accordance with these embodiments, cooperation with a resource allocation which might otherwise be rejected, or incentivized the members not to defect from the community. Further, this mechanism incentivizes active participation, which may lead to a more liquid market and more optimal allocations. The auction may be a combinatorial auction. A plurality of suppliers may transact with a plurality of buyers in a single transaction. In accordance with one embodiment, only bidders having a significant risk of being within the set of prevailing parties are distributed the portion of the economic surplus. A portion of the economic surplus may be allocated dependent on a risk of being within the set of prevailing parties. Bidders may be required to pay a bid fee, for example a non-refundable deposit. This bid fee may itself be set, scale with the bid, or set by the bidder, wherein the payback may be a function of the winning bid amount, bidder bid, amount paid, and parameters of other bidders. The economic surplus may be allocated in such manner to increase the liquidity of a market.

The present invention further provides an ad hoc communication node, comprising: an input for receiving communications and an output for generating communications; and a processor, for seeking an optimization of an ad hoc communication network, said processor determining a network state for a portion of the network and estimating a network state for a different portion of the network, said processor engaging in a transaction with another node for transferring a risk of an erroneous state estimation.

BRIEF DESCRIPTION OF THE DRAWINGS

The drawings show:

FIG. 1 shows a block diagram of a first embodiment of the present invention;

FIG. 2 shows a block diagram of a second embodiment of the present invention;

FIG. 3 shows a flowchart of a first method in accordance with the present invention;

FIG. 4 shows a flowchart of a second method in accordance with the present invention;

DESCRIPTION OF THE INVENTION

Figure 5:
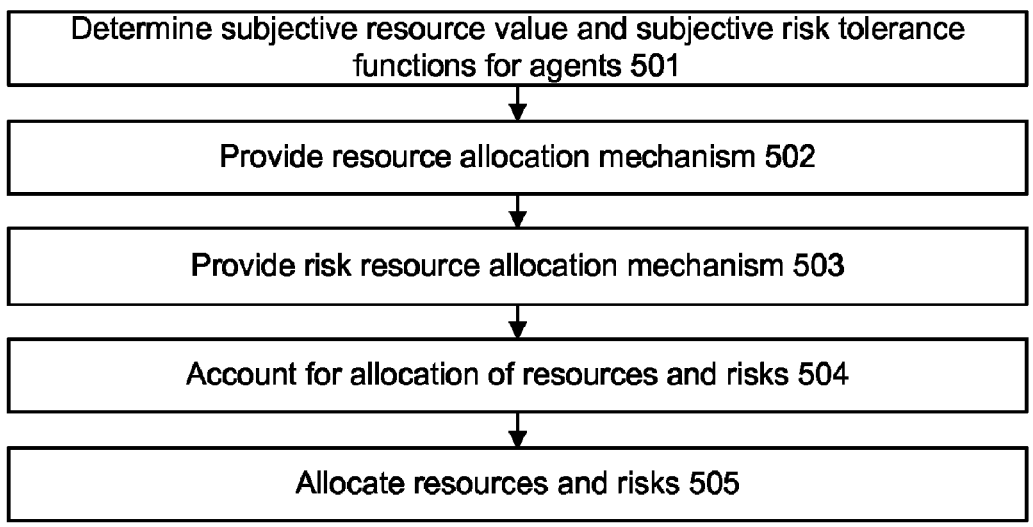
FIG. 5 shows a flowchart of a third method in accordance with the present invention.
Figure 6:
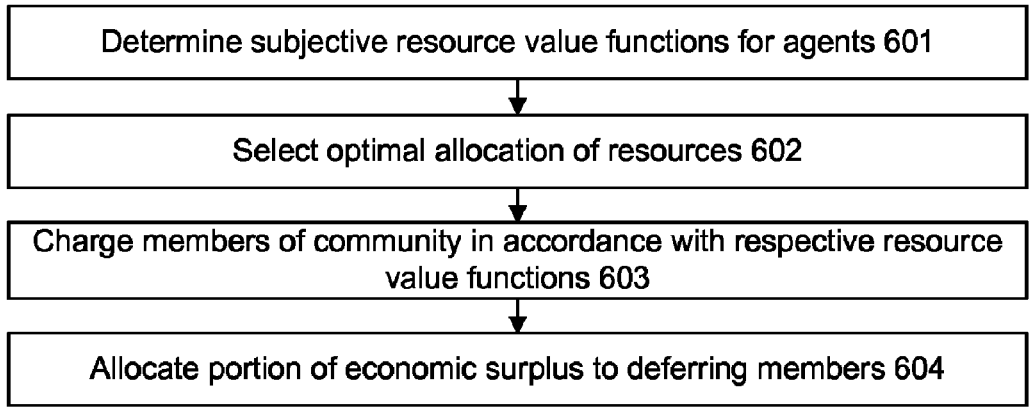
FIG. 6 shows a flowchart of a fourth method in accordance with the present invention.
Figure 7:
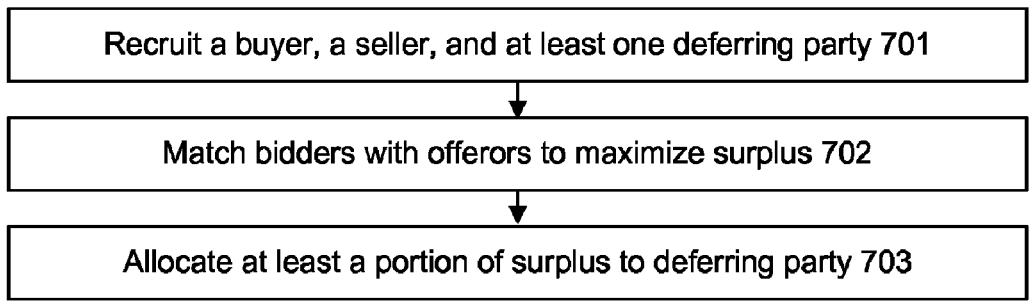
FIG. 7 shows a flowchart of a fifth method in accordance with the present invention.
Figure 8:
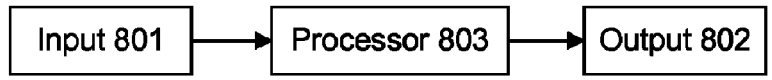
FIG. 8 shows a block diagram of a third embodiment of the present invention.

This disclosure incorporates herein by reference the entirety of WO/2006/029297.

The present invention seeks, among other aspects, to apply aspects of optimization theory to the control and arbitration of communities of resources, that is, elements or agents which operate independently and therefore cannot be directly controlled without compromise. Rather, the system is controlled by providing incentives and disincentives for various behaviors and actions seeking to promote an efficient outcome for the system as a whole, given the external constraints. Each agent then maximizes its own state based on its own value function, in light of the incentives and disincentives, resulting in an optimal network.

This optimization employs elements of game theory, and the present invention therefore invokes all those elements encompassed within its scope as applied to the problems and systems presented. The ad hoc network of elements typically reside within "communities", that is, the present invention does not particularly seek to apply principles to trivial networks which can be optimized without compromise or arbitration, although its principles may be applicable. The present invention therefore applies to the enhancement or optimization of communities. These communities may themselves have various rules, reputation hierarchies, arrangements or cultures, which can be respected or programmed as a part of the system operation, or merely operate as constraints on optimization. Thus, in accordance with a game theoretic analysis, various rules and perceived benefits may be applied to appropriately model the real system, or may be imposed to control behavior.

These communities may be formed or employed for various purposes, and typically interoperate in a "commons" or economy, in which all relevant actions of each member of the community have an effect on others, and this effect can be quantified or normalized into "economic" terms. For example, a typical application of this technology would be to arbitrate access to a common or mutually interfering medium, such as a communications network. By optimizing communications, the greatest aggregate value of communications will generally be achieved, which may or may not correspond to a greatest aggregate communications bandwidth. For example, both quantity and quality of service may be independent (or semi-independent) parameters. Thus, the system tends to promote a high quality of service (or at least as high a quality as is required) over a bulk volume of service. This, in turn, permits new applications which depend on reliable communications.

A general type of economic optimization is a market economy, in which independent agents each act to maximize their respective interests. A subset of a market is an auction, in which a resource is allocated to a highest valued user or consumer, or a user or consumer acquires a resource at a lowest cost, in a single process. In a market economy, agents may act as peers, and each agent may act as a source of supply or assert a demand. That is, at some market price, a consumer may relinquish assets to others and become a supplier. Generally, a consumer has a higher private value for a resource than a supplier. The suppler, for example, may have a lower cost to obtain the resource, or a lower value for consumption of the resource, or both. Peers that both buy and sell a resource may seek to arbitrage, that is, seek to establish a committed source of supply at a lower cost than a committed purchaser, thus assuring a profit. In order to be effective, arbitrage requires that the intermediary have an advantage, or else the ultimate buyer would transact directly with the ultimate seller. The advantage(s) may be, for example, information, proprietary elements or methods, location, lower transactional costs, available capital, risk tolerance, storage facility, or the like.

So long as the advantage does not derive from an economically inefficiency monopoly or other structure that artificially and/or "illegally" limits the efficiency of other agents, the arbitrage agent increases net efficiency of the network. That is, the presence and action of the arbitrage agent increases the economic surplus of the transaction and the market in general.

An object of the present invention therefore seeks to overcome the inefficiency of seeking to solve a complex NP-complete optimization problem by providing arbitrage opportunities that allow a market solution to the optimization which balances optimization cost with intermediary profits. Accordingly, while the net result may deviate from an abstract optimum condition, when one considers the cost of achieving this abstract optimum, the arbitrage-mediated result is superior in terms of market surplus. The availability of arbitrage and intermediaries therefore allows a particular agent to balance its own optimization costs against overall gains.

The subject of complexity theory, including combinatorial optimization, and solution of approximation of NP-complete problems, has been extensively studied. See, e.g., the references set forth in the combinatorial optimization and auction appendix, which are expressly incorporated herein by reference.

Assuming a set of rational agents, each agent will seek to locally optimize its state to achieve the greatest gains and incur the lowest net costs. Thus, in a system which seeks to optimize a network of such agents, by permitting each agent to optimize its local environment state, the network may then be approximated by a network of local, environments, each typically comprising a plurality of agents. Thus, in the same way as the complexity of an NP-complete problem grows in polynomial space, the simplification of an NP complete problem will also be polynomial. While this simplification incurs an inefficiency, each agent models a proximate region in the space of interest, which tends to be linear (i.e., superposable) in a preferred embodiment. Agents compete with each other, and therefore the incentive to distort is limited. Likewise, since the preferred simplification of the problem does not impose a heuristic (i.e., a substitution of a first relatively simpler or more readily analytic algorithm for a second more intractable algorithm), it does not accordingly distort the incentives from those inherent in the basic optimization.

In a simple auction, a role is imposed on an agent, while in a market an agent can choose its own role dynamically, in a series of transactions, dependent on its own value function. In a market, a set of agents having a resource or requiring a resource seek to interact to reallocate the resource, such that the needs are generally satisfied, up to a "market clearing price". That is, individual agents transact to transfer the resource from those with supply to those with demand, at a price between the private values of the two agents, which reallocation occurs until the demand ask price is higher than the supply bid price. An auction is designed to maximize the economic surplus, which is then typically allocated to the more restrictive of the source of supply or consumer or the sponsor. A market, on the other hand, generally operates to minimize the gap between bid and ask over an extended period, and thus the economic surplus tends to proportionate based on the balance of supply and demand at the clearing price. The particular reallocation also depends on the state of information of each agent, inefficiencies in transfer, and the like.

Where a need or supply is not unitary, one possible means for achieving an optimal solution is a combinatorial auction, in which multiple suppliers, or multiple consumers, or both, reallocate the resource or portions thereof. Thus, a single need is not met by a single supplier, but rather there are at least three parties to a transaction. The net result is a competition between parties that raises the potential for a holdout. In fact, one way to circumvent this issue (a "holdout" problem) is to have direct or indirect (bypass) competition for each element. In such a circumstance, no agent can effectively demand more than the least cost alternate(s).

A combinatorial auction (multifactorial optimization, also known as a Vickrey Clarke Grove [VCG] Auction) seeks to match, for the entire network of possibilities, the highest valued users with the lowest cost suppliers. This leads, however, to a surplus between the two, which must be allocated. In a one-to-many auction, the surplus is generally allocated to the restricted agent, i.e., the agent(s) with "market power". On the other hand, in an optimal market, the surplus will tend toward zero. That is, the profit to each party will tend toward a competitive mean, with higher profits only gained by undertaking higher risk. In imperfect markets, arbitrage opportunities exist, where profits can be made by trading the same resource.

In a multihop ad hoc network, a path between source and destination consists of a number of legs, with alternate paths available for selection of an optimum. If each node has its own distinct destination, there will likely be competing demands for each intermediate communication node.

One way to promote revealing a private value is if the end result of the process does not penalize those with aberrantly high or low values. One known method is to compute the result of the process as if the bidder or askor was not involved, leading to a so-called second price. Thus, the highest bidder wins, at a price established by a second highest bid. A lowest askor wins, at a price established by the second lowest askor. In a market, the highest bidder and lowest askor win, with a second price dependant on a more restrictive of supply and demand. In a combinatorial auction, this may be extended to price each component as if the highest bidder was uninvolved. In one embodiment of the invention, the second price applies to both buyer and seller, respectively, with the economic surplus allocated to other purposes. Thus, in this case, neither party gains the particular benefit of an imbalance of supply and demand. In fact, this perturbs the traditional market somewhat, in that an imbalance in supply and demand does not particularly recruit new market entrants in the same manner as an allocation of the surplus.

Arbitrage

The present invention seeks to model, within a microeconomy, the elements of the real economy which tend to improve efficiency toward "perfection", that is, a perfect universal balance of supply and demand, for which no strategy (other than bidding a true private value) will produce a superior result. It is known that combinatorial auctions permit arbitrage opportunities. See, Andrew Gilpin and Tuomas Sandholm. 2004. Arbitrage in Combinatorial Exchanges. AAMAS-04 6th Workshop on Agent Mediated Electronic Commerce (AMEC-VI), New York, N.Y., 2004, expressly incorporated herein by reference.

These efficiency producing elements, paradoxically, are the parasitic elements which thrive off of predictable inefficiencies. That is, by promoting competition among the parasitic elements, an efficient balance of optimization of the direct market and optimization of the derivative markets will produce an overall superior result to an optimization of the direct market alone.

While the use of derivative markets in real economies is well known, the implementation of these as aspects of microeconomies and isolated markets is not well known, and a part of an embodiment of the present invention. For example, in a corporate bankruptcy auction, there are often resellers present who seek to purchase assets cheaply at a "wholesale" price, and to redistribute them on a less urgent basis or in smaller quantities, or at a different location, or otherwise transformed, and to sell them at a higher "retail" price. The auction price is determined by the number and constitution of bidders, as well as the possibility of proxy or absentee bidding. In fact, we presume that the auctioneers themselves are efficient, and that significantly higher bid prices are not available in a modified process without incurring substantial investment, risk, or delay. Indeed, these premises in a narrow sense might be false, i.e., a rational auctioneer might indeed make greater investment, undertake higher risk, or incur greater delay. However, this possible inefficiency merely shifts the allocation of the surplus, and to the extent there is a substantial gain to be made, encourages arbitrage, which in turn encourages competition at subsequent auctions, leading to at least a partial remediation of the allocation "error" in the long term, over a series of auctions.

Therefore, the market system, with derivative and arbitrage possibilities, and deviations from optimal performance is at least partially self-correcting over the long term.

Likewise, because the system has mechanisms for reducing the effects of imperfections in the presumptions and/or the conformance of a real system to the stated mechanisms and applicable rules, particular aspects of the system which impose administrative or overhead burdens may be circumvented by imposing less restrictive criteria and allowing a "self correcting" mechanism to remediate. Thus, for example, if a theoretically ideal mechanism imposes a 15% burden due to overhead, thus achieving an 85% overall efficiency (100−15=85), while a simplifying presumption achieves a result which imposes a 20% efficiency impairment but only a 2% overhead factor (100−20−2=78), and an arbitrage mechanism is available to correct the simplified model to gain 12% efficiency with another 2% overhead (78+12−2), the net result is 88% efficiency, above that of the theoretically ideal mechanism.

An arbitrage mechanism seeks to identify inefficiency based on superior information or mechanism, and a pricing or value disparity, and conduct a countertrade seeking to exploit the disparity while undertaking relatively low risk, to increase overall market efficiency. (That is, to ultimately reallocate resources from a lower valued holder to a higher valued holder).

An ad hoc network generally presents a case where individual nodes have imperfect information, and efforts to gain better information invariably lead to increased overhead. Therefore, by intentionally truncating the information gathering and discovery aspect of the ad hoc network, a residual arbitrage opportunity will remain, but the inherent inefficiency of the arbitrage may be less than the corresponding overhead involved in providing more perfect information to the individual nodes (i.e., overall arbitrage cost is less than efficiency gain).

As such, a design feature of an embodiment of the invention is to provide or even encourage arbitrage mechanisms and arbitrage opportunities, in an effort to improve overall system efficiency. In fact, an embodiment of the system is preferably constructed to regularly provide arbitrage opportunities which can be conducted with low risk and with substantial market efficiency gains, and these arbitrage opportunities may be an important part of the operation of the embodiment.

A second opportunity provides risk transference, such as debt transactions, insurance, and market-making, and/or the like. In such transactions, a market risk is apparent. Each node, on the other and, has its own subjective risk tolerance. Likewise, the market risk provides an opportunity for nodes having a high risk tolerance to improve yield, by trading risk for return. Those nodes which have generally greater liquid resources, which inherently have no return while uninvested, and may permit other nodes having lesser resources to borrow, at interest. Because there is a risk of non-payment, nodes may have different credit ratings, and this creates an opportunity for credit rating "agencies" and/or guarantors. In an ad hoc network, there is also a possibility for delivery failure, which, in turn, provides an opportunity for insurance.

Manet System

Multihop Ad Hoc Networks require cooperation of nodes which are relatively disinterested in the content being conveyed. Typically, such disinterested intermediaries incur a cost for participation, for example, power consumption or opportunity cost. Economic incentives may be used to promote cooperation of disinterested intermediaries, also known as recruitment. An economic optimization may be achieved using a market-finding process, such as an auction. In many scenarios, the desire for the fairness of an auction is tempered by other concerns, i.e., there are constraints on the optimization which influence price and parties of a transaction. For example, in military communication systems, rank may be deemed an important factor in access to, and control over, the communications medium. A simple process of rank-based preemption, without regard for subjective or objective importance, will result in an inefficient economic distortion. In order to normalize the application of rank, one is presented with two options: imposing a normalization scheme with respect to rank to create a unified economy, or providing considering rank using a set of rules outside of the economy. One way to normalize rank, and the implicit hierarchy underlying the rank, is by treating the economy as an object-oriented hierarchy, in which each individual inherits or is allocated a subset of the rights of a parent, with peers within the hierarchy operating in a purely economic manner. The extrinsic consideration of rank, outside of an economy, can be denominated "respect", which corresponds to the societal treatment of the issue, rather than normalizing this factor within the economy, in order to avoid unintended secondary economic distortion. Each system has its merits and limitations.

An economic optimization is one involving a transaction in which all benefits and detriments can be expressed in normalized terms, and therefore by balancing all factors, including supply and demand, at a price, an optimum is achieved. Auctions are well known means to achieve an economic optimization between distinct interests, to transfer a good or right in exchange for a market price. While there are different types of auctions, each having their limitations and attributes, as a class these are well accepted as a means for transfer of goods or rights at an optimum price. Where multiple goods or rights are required in a sufficient combination to achieve a requirement, a so-called Vickrey-Clarke-Groves (VCG) auction may be employed. In such an auction, each supplier asserts a desired price for his component. The various combinations which meet the requirement are then compared, and the lowest selected. In a combinatorial supply auction, a plurality of buyers each seeks a divisible commodity, and each bids its best price. The bidders with the combination of prices which are maximum are selected. In a commodity market, there are a plurality of buyers and sellers, so the auction is more complex. In a market economy, the redistribution of goods or services are typically transferred between those whose value them least to those who value them most. The transaction price depends on the balance between supply and demand; with the surplus being allocated to the limiting factor.

Derivatives, Hedges, Futures and Insurance

In a market economy, the liquidity of the commodity is typically such that the gap between bid and ask is small enough that the gap between them is small enough that it is insignificant in terms of preventing a transaction. In a traditional market, the allocation of the surplus oscillates in dependence on whether it is a buyer's or seller's market. Of course, the quantum of liquidity necessary to assure an acceptably low gap is subjective, but typically, if the size of the market is sufficient, there will be low opportunity for arbitrage, or at least a competitive market for arbitrage. The arbitrage may be either in the commodity, or options, derivatives, futures, or the like.

In a market for communications resources, derivatives may provide significant advantages over a simple unitary market for direct transactions. For example, a node may wish to procure a reliable communications pathway (high quality of service or QoS) for an extended period. Thus, it may seek to commit resources into the future, and not be subject to future competition for or price fluctuation of those resources, especially being subject to a prior broadcast of its own private valuation and a potential understanding by competitors of the presumed need for continued allocation of the resources. Thus, for similar reasons for the existence of derivative, options, futures, etc. markets in the real economy, their analogy may be provided within a communications resource market.

In a futures market analogy, an agent seeks to procure its long-term or bulk requirements, or seeks to dispose of its assets in advance of their availability. In this way, there is increased predictability, and less possibility of self-competition. It also allows transfer of assets in bulk to meet an entire requirement or production lot capability, thus increasing efficiency and avoiding partial availability or disposal.

One issue in mobile ad hoc networks is accounting for mobility of nodes and unreliability of communications. In commodities markets, one option is insurance of the underlying commodity and its production. The analogy in communications resource markets focuses on communications reliability, since one aspect of reliability, nodal mobility is "voluntary" and not typically associated with an insurable risk. On the other hand, the mobility risk may be mitigated by an indemnification. In combination, these, and other risk transfer techniques, may provide means for a party engaged in a communications market transaction to monetarily compensate for risk tolerance factors. An agent in the market having a low risk tolerance can undertake risk transference, at some additional but predetermined transaction costs, while one with a high risk tolerance can "go bare" and obtain a lower transaction cost, or undertake third party risk for profit.

Insurance may be provided in various manners. For example, some potential market participants may reserve wealth, capacity or demand for a fee, subject to claim in the event of a risk event. In other cases, a separate system may be employed, such as a cellular carrier, to step in, in the event that a lower cost resource is unavailable (typically for bandwidth supply only). A service provider may provide risk-related allocations to network members in an effort to increase perceived network stability; likewise, if the network is externally controlled, each node can be subject to a reserve requirements which is centrally (or hierarchally) allocated.

If an agent promises to deliver a resource, and ultimately fails to deliver, it may undertake an indemnification, paying the buyer an amount representing "damages" or "liquidated damages", the transaction cost of buyer, e.g., the cost or estimated cost of reprocurement plus lost productivity and/or gains. Likewise, if an agent fails to consume resources committed to it, it owes the promised payment, less the resale value of the remaining resources, if any. An indemnification insurer/guarantor can undertake to pay the gap on behalf of the defaulting party. Typically, the insurer may, but need not be, a normal agent peer.

Hedge strategies may also be employed in known manner.

In order for markets to be efficient, there must be a possibility of beneficial use or resale of future assets. This imposes some complexity, since the assets are neither physical nor possessed by the intermediary. However, cryptographic authentication of transactions may provide some remedy. On the other hand, by increasing liquidity and providing market-makers, the transaction surplus may be minimized, and thus the reallocation of the surplus as discussed above minimized. Likewise, in a market generally composed of agents within close proximity, the interposition of intermediaries may result in inefficiencies rather than efficiencies, and the utility of such complexity may better come from the facilitation of distant transactions. Thus, if one presumes slow, random nodal mobility, little advantage is seen from liquid resource and demand reallocation. On the other hand, if an agent has a predefined itinerary for rapidly relocating, it can efficiently conduct transactions over its path, prearranging communication paths, and thus providing trunk services. Thus, over a short term, direct multihop communications provide long-distance communications of both administrative and content data. On the other hand, over a longer term, relocation of agents may provide greater efficiency for transport of administrative information, increasing the efficiency of content data communications over the limited communications resources, especially if a store-and-forward paradigm is acceptable.

It is noted that in an economy having persistent and deep use of financial derivatives, a stable currency is preferred, and the declining value credit discussed above would provide a disincentive to agents who might otherwise take risks over a long time-frame. It is possible, however, to distinguish between credits held by "consumers" and those held by "arbitrageurs" or institutions, with the former having a declining value but can be spent, and those which have a stable value but must be first converted (at some possible administrative cost) for consumer use.

Bandwidth Auction

A previous scheme proposes the application of game theory in the control of multihop mobile ad hoc networks according to "fair" principles. In this prior scheme, nodes seeking to control the network (i.e., are "buyers" of bandwidth), conduct an auction for the resources desired. Likewise, potential intermediate nodes conduct an auction to supply the resources. The set of winning bidders and winning sellers is optimized to achieve the maximum economic surplus. Winning bidders pay the maximum bid price or second price, while winning sellers receive their winning ask or second price. The remaining surplus is redistributed among the winners and losing bidders, whose cooperation and non-interference with the winning bidders is required for network operation. The allocation of the portion to losing bidders is, for example, in accordance with their proportionate bid for contested resources, and for example, limited to the few (e.g., 3) highest bidders or lowest offerors. The winning bids are determined by a VCG combinatorial process. The result is an optimum network topology with a reasonable, but by no means the only, fairness criterion, while promoting network stability and utility.

The purpose of rewarding losers is to encourage recruitment, and therefore market liquidity. In order to discourage strategic losing bids, one possible option is to impose a statistical noise on the process to increase the risk that a strategically losing bid will be a winning bid. Another way is to allocate the available surplus corresponding to the closeness of the losing bid to the winning bid, not merely on its magnitude. Alternately, a "historical" value for the resource may be established, and an allocation made only if the bid is at or above the trailing mean value. Further, the loser's allocation may be dependent on a future bid with respect to a corresponding resource at or above the prior value. In similar manner, various algorithms for surplus allocation may be designed to encourage recruitment of agents seeking to win, while possibly discouraging bidders who have little realistic possibility of winning. Bidders who do not seek to win impose an inefficiency on the network, for example requiring other agents to communicate, evaluate, acknowledge, and defer to these bids. Therefore, a relatively small bidding fee may be imposed in order to assert a bid, which may be used to increase the available surplus to be allocated between the winning and top losing bidders.

As discussed above, risk may be a factor in valuing a resource. The auction optimization may therefore be normalized or perturbed in dependence on an economic assessment of a risk tolerance, either based on a personal valuation, or based on a third party valuation (insurance/indemnification). Likewise, the optimization may also be modified to account for other factors.

Thus, one issue with such a traditional scheme for fair allocation of resources is that it does not readily permit intentional distortions, that is, the system is "fair". However, in some instances, a relatively extrinsic consideration to supply and subjective demand may be a core requirement of a system. For example, in military systems, it is traditional and expected that higher military rank will provide access to and control over resources on a favored basis. (Note that, in contrast to an example discussed elsewhere herein, this favoritism is not enforced by a hierarchal wealth generation distribution). In civilian systems, emergency and police use may also be considered privileged. However, by seeking to apply economic rules to this access, a number of issues arise. Most significantly, as a privileged user disburses currency, this is distributed to unprivileged users, leading to an inflationary effect and comparative dilution of the intended privilege. If the economy is real, that is the currency is linked to a real economy, this grant of privilege will incur real costs, which is also not always an intended effect. If the economy is synthetic, that is, it is unlinked to external economies, then the redistribution of wealth within the system can grant dramatic and potentially undesired control to a few nodes, potentially conveying the privilege to those undeserving, except perhaps due to fortuitous circumstances such as being in a critical location or being capable of interfering with a crucial communication.

Two different schemes may be used to address this desire for both economic optimality and hierarchal considerations. One scheme maintains optimality and fairness within the economic structure, but applies a generally orthogonal consideration of "respect" as a separate factor within the operation of the protocol. Respect is a subjective factor, and thus permits each bidder to weight its own considerations. It is further noted that Buttyan et al. have discussed this factor as a part of an automated means for ensuring compliance with network rules, in the absence of a hierarchy. Levente Buttyan and Jean-Pierre Hubaux, Nuglets: a Virtual Currency to Stimulate Cooperation in Self-Organized Mobile Ad Hoc Networks, Technical Report DSC/2001/004, EPFL-DI-ICA, January 2001, incorporated herein by reference. See, P. Michiardi and R. Molva, CORE: A collaborative reputation mechanism to enforce node cooperation in mobile ad hoc networks, In B. Jerman-Blazic and T. Klobucar, editors, Communications and Multimedia Security, IFIP TC6/TC11 Sixth Joint Working Conference on Communications and Multimedia Security, Sep. 26-27, 2002, Portoroz, Slovenia, volume 228 of IFIP Conference Proceedings, pages 107-121. Kluwer Academic, 2002; Sonja Buchegger and Jean-Yves Le Boudec, A Robust Reputation System for P2P and Mobile Ad-hoc Networks, Second Workshop on the Economics of Peer-to-Peer Systems, June 2004; Po-Wah Yau and Chris J. Mitchell, Reputation Methods for Routing Security for Mobile Ad Hoc Networks; Frank Kargl, Andreas Klenk, Stefan Schlott, and Micheal Weber. Advanced Detection of Selfish or Malicious Nodes in Ad Hoc Network. The 1st European Workshop on Security in Ad-Hoc and Sensor Networks (ESAS 2004); He, Qi, et al., SORI: A Secure and Objective Reputation-based Incentive Scheme for Ad-Hoc Networks, IEEE Wireless Communications and Networking Conference 2004, each of which is expressly incorporated herein by reference.

The bias introduced in the system operation is created by an assertion by one claiming privilege, and deference by one respecting privilege. One way to avoid substantial economic distortions is to require that the payment made be based on a purely economic optimization, while selecting the winner based on other factors. In this way, the perturbations of the auction process itself is subtle, that is, since bidders realize that the winning bid may not result in the corresponding benefit, but incurs the publication of private values and potential bidding costs, there may be perturbation of the bidding strategy from optimal. Likewise, since the privilege is itself unfair and predictable, those with lower privilege ratings will have greater incentive to defect from, or act against, the network. Therefore, it is important that either the assertion of privilege be subjectively reasonable to those who must defer to it, or the incidence or impact of the assertions be uncommon or have low anticipated impact on the whole. On the other hand, the perturbation is only one-sided, since the payment is defined by the network absent the assertion of privilege.

In the extreme case, the assertion of privilege will completely undermine the auction optimization, and the system will be prioritized on purely hierarchal grounds, and the pricing non-optimal or unpredictable. This condition may be acceptable or even efficient in military systems, but may be unacceptable where the deference is voluntary and choice of network protocol is available, i.e., defection from the network policies is an available choice.

It is noted that those seeking access based on respect, must still make an economic bid. This bid, for example, should be sufficient in the case that respect is not afforded, for example, from those of equal rank or above, or those who for various reasons have other factors that override the assertion of respect. Therefore, one way to determine the amount of respect to be afforded is the self-worth advertised for the resources requested. This process therefore may minimize the deviation from optimal and therefore promotes stability of the network. It is further noted that those who assert respect based on hierarchy typically have available substantial economic resources, and therefore it is largely a desire to avoid economic redistribution rather than an inability to effect such a redistribution, that compels a consideration of respect.

In a combinatorial auction, each leg of a multihop link is separately acquired and accounted. Therefore, administration of the process is quite involved. That is, each bidder broadcasts a set of bids for the resources required, and an optimal network with maximum surplus is defined. Each leg of each path is therefore allocated a value. In this case, it is the winning bidder who defers based on respect, since the other resources are compensated equally and therefore agnostic.

Thus, if pricing is defined by the economic optimization, then the respect consideration requires that a subsidy be applied, either as an excess payment up to the amount of the winning bid, or as a discount provided by the sellers, down to the actually bid value.

Since the pricing is dependent on the network absent the respect consideration, there is an economic deficit or required subsidy. In some cases, the respected bidder simply pays the amount required, in excess of its actual bid. If we presume that the respected bidder could have or would have outbid the winning bidder, it then pays the third price, rather than the second price. If the respected bidder does not have, or will not allocate the resources, then the subsidy must come from the others involved. On one hand, since the respect in this case may be defined by the otherwise winning bidder, this bidder, as an element of its respect, may pay the difference. However, this cost (both the lost economic gains of the transaction and the subsidy) will quickly disincentivize any sort of grant of respect. The recipients could also provide a discount; however this would require consent of both the winning bidder and the recipients, making concluding the transaction more difficult. One other possibility is to request "donations" from nearby nodes to meet the subsidy, a failure of which undermines the assertion of respect.

Another alternate is to assume that there is a surplus between the aggregate winning bid and the aggregate cost, and so long as the bidder claiming respect pays the minimum cost, then the system remains operable, although the benefits of surplus allocation are lost, and all affected nodes must defer to this respect mechanism. In this case, it is more difficult to arbitrate between competing demands for respect, unless a common value function is available, which in this case we presume is not available.

The node demanding respect may have an impact on path segments outside its required route and the otherwise optimal interfering routes; and thus the required payment to meet the differential between the optimum network and the resulting network may thus be significant.

It is noted that, in the real economy, where the U.S. Government allocates private resources, it is required to pay their full value. This model appears rational, and therefore a preferred system requires a node claiming privilege and gaining a resulting benefit to pay the winning bid value (as an expression of market value), and perhaps in addition pay the winning bidder who is usurped its anticipated benefit, that is, the difference in value between the second price and its published private valuation, this having an economically neutral affect, but also requiring a respected node to potentially possess substantial wealth.

A further possible resolution of this issue provides for an assessment of an assertion of respect by each involved node. Since the allocation of respect is subjective, each bidder supplies a bid, as well as an assertion of respect. Each other node receives the bids and assertions, and applies a weighting or discount based on its subjective analysis of the respect assertion. In this case, the same bid is interpreted differently by each supplier, and the subjective analysis must be performed by or for each supplier. By converting the respect assertion into a subjective weighting or discount, a pure economic optimization may then be performed, with the subjectively perturbed result by each node reported and used to compute the global optimization.

An alternate scheme for hierarchal deference is to organize the economy itself into a hierarchy, as discussed in the first example. In a hierarchy, a node has one parent and possibly multiple children. At each level, a node receives an allocation of wealth from its parent, and distributes all or a portion of its wealth to children. A parent is presumed to control its children, and therefore can allocate their wealth or subjective valuations to its own ends. When nodes representing different lineages must be reconciled, one may refer to the common ancestor for arbitration, or a set of inherited rules to define the hierarchal relationships.

In this system, the resources available for reallocation between branches of the hierarchy depend on the allocation by the common grandparent, as well as competing allocations within the branch. This system presumes that children communicate with their parents and are obedient. In fact, if the communication presumption is violated, one must then rely on a priori instructions, which may not be sufficiently adaptive to achieve an optimal result. If the obedience presumption is violated, then the hierarchal deference requires an enforcement mechanism within the hierarchy. If both presumptions are simultaneously violated, then the system will likely fail, except on a voluntary basis, with results similar to the "reputation" scheme described herein.

Thus, it is possible to include hierarchal deference as a factor in optimization of a multihop mobile ad hoc network, leading to compatibility with tiered organizations, as well as with shared resources.

Application of Game Theory to Ad Hoc Networks

There are a number of aspects of ad hoc network control which may be adjusted in accordance with game theoretic approaches. An example of the application of game theory to influence system architecture arises when communications latency is an issue. A significant factor in latency is the node hop count. Therefore, a system may seek to reduce node hop count by using an algorithm other than a nearest neighbor algorithm, bypassing some nodes with longer distance communications. In analyzing this possibility, one must not only look at the cost to the nodes involved in the communication, but also the cost to nodes which are prevented from simultaneously accessing the network due to interfering uses of network resources. As a general proposition, the analysis of the network must include the impact of each action, or network state, on every node in the system, although simplifying presumptions may be appropriate where information is unavailable, or the anticipated impact is trivial.

Game theory is readily applied in the optimization of communications routes through a defined network, to achieve the best economic surplus allocation. In addition, the problem of determining the network topology, and the communications themselves, are ancillary, though real, applications of game theory. Since the communications incidental to the arbitration require consideration of some of the same issues as the underlying communications, corresponding elements of game theory may apply at both levels of analysis. Due to various uncertainties, the operation of the system is stochastic. This presumption, in turn, allows estimation of optimality within a margin of error, simplifying implementation as compared to a rigorous analysis without regard to statistical significance.

There are a number of known and proven routing models proposed for forwarding of packets in ad hoc networks. These include Ad Hoc On-Demand Distance Vector (AODV) Routing, Optimized Link State Routing Protocol (OLSR), Dynamic Source Routing Protocol (DSR), and Topology Dissemination Based on Reverse-Path Forwarding (TBRPF).

There can be significant differences in optimum routing depending on whether a node can modulate its transmit power, which in turn controls range, and provides a further control over network topology. Likewise, steerable antennas, antenna arrays, and other forms of multiplexing provide further degrees of control over network topology. Note that the protocol-level communications are preferably broadcasts, while information conveyance communications are typically point-to-point. Prior studies typically presume a single transceiver, with a single omnidirectional antenna, operating according to in-band protocol data, for all communications. The tradeoff made in limiting system designs according to these presumptions should be clear.

It is the general self-interest of a node to conserve its own resources, maintain an opportunity to access network resources, while consuming whatever resource of other nodes as it desires. Clearly, this presents a significant risk of the "tragedy of the commons", in which selfish individuals fail to respect the very basis for the community they enjoy, and a network of rational nodes operating without significant incentives to cooperate would likely fail. On the other hand, if donating a node's resources generated a sufficient associated benefit to that node, while consuming network resources imposed a sufficient cost, stability and reliability can be achieved. So long as the functionality is sufficient to meet the need, and the economic surplus is "fairly" allocated, that is, the cost incurred is less than the private value of the benefit, and that cost is transferred as compensation to those burdened in an amount in excess of their incremental cost, adoption of the system should increase stability. In fact, even outside of these bounds, the system may be more stable than one which neither taxes system use nor rewards altruistic behavior. While the basic system may be a zero sum system, and over time, the economic effects will likely average out (assuming symmetric nodes), in any particular instance, the incentive for selfish behavior by a node will be diminished.

One way to remedy selfish behavior is to increase the cost of acting this way, that is, to impose a cost or tax for access to the network. In a practical implementation, however, this is problematic, since under lightly loaded conditions, the "value" of the communications may not justify a fixed cost which might be reasonable under other conditions, and likewise, under heavier loads, critical communications may still be delayed or impeded. A variable cost, dependent on relative "importance", may be imposed, and indeed, as alluded to above, this cost may be market based, in the manner of an auction. In a multihop network, such an auction is complicated by the requirement for a distribution of payments within the chain of nodes, with each node having potential alternate demands for its cooperation. The market-based price-finding mechanism excludes nodes which ask a price not supported by its market position, and the auction itself may comprise a value function encompassing reliability, latency, quality of service, or other non-economic parameters, expressed in economic terms. The network may further require compensation to nodes which must defer communications because of inconsistent states, such as in order to avoid interference or duplicative use of an intermediary node, and which take no direct part in the communication. It is noted that the concept of the winner of an auction paying the losers is not generally known, and indeed somewhat counterintuitive. Indeed, the effect of this rule perturbs the traditional analysis framework, since the possibility of a payment from the winner to the loser alters the allocation of economic surplus between the bidder, seller, and others. Likewise, while the cost to the involved nodes may be real, the cost to the uninvolved nodes may be subjective. While it would appear that involved nodes would generally be better compensated than uninvolved nodes, the actual allocation or reallocation of wealth according to the optimization may result in a different outcome.

The network provides competitive access to the physical transport medium, and cooperation with the protocol provides significant advantages over competition with it. Under normal circumstances, a well developed ad hoc network system can present as a formidable coordinated competitor for access to contested bandwidth by other systems, while within the network, economic surplus is optimized. Thus, a node presented with a communications requirement is presented not with the simple choice to participate or abstain, but rather whether to participate in an ad hoc network with predicted stability and mutual benefit, or one with the possibility of failure due to selfish behavior, and non-cooperation. Even in the absence of a present communication requirement, a network which rewards cooperative behavior may be preferable to one which simply expects altruism without rewarding it.

The protocol may also encompass the concept of node reputation, that is, a positive or negative statement by others regarding the node in question. P. Michiardi and R. Molva. Core: A collaborative reputation mechanism to enforce node cooperation in mobile ad hoc networks. In Communication and Multimedia Security 2002 Conference, 2002. This reputation may be evaluated as a parameter in an economic analysis, or applied separately, and may be anecdotal or statistical. In any case, if access to resources and payments are made dependent on reputation, nodes will be incentivized to maintain a good reputation, and avoid generating a bad reputation. Therefore, by maintaining and applying the reputation in a manner consistent with the community goals, the nodes are compelled to advance those goals in order to benefit from the community. Game theory distinguishes between good reputation and bad reputation. Nodes may have a selfish motivation to assert that another node has a bad reputation, while it would have little selfish motivation, absent collusion, for undeservedly asserting a good reputation. On the other hand, a node may have a selfish motivation in failing to reward behavior with a good reputation.

Economics and reputation may be maintained as orthogonal considerations, since the status of a node's currency account provides no information about the status of its reputation.

This reputation parameter may be extended to encompass respect, that is, a subjective deference to another based on an asserted or imputed entitlement. While the prior system uses reputation as a factor to ensure compliance with system rules, this can be extended to provided deferential preferences either within or extrinsic to an economy. Thus, in a military hierarchy, a relatively higher ranking official can assert rank, and if accepted, override a relatively lower ranking bidder at the same economic bid. For each node, an algorithm is provided to translate a particular assertion of respect (i.e., rank and chain of command) into an economic perturbation. For example, in the same chain of command, each difference in rank might be associated with a 25% compounded discount, when compared with other bids, i.e.

$$B_1 = B_0 \times 10(1 + 0.25 \times \Delta R),$$

Wherein $B_1$ is the attributed bid, $B_0$ is the actual bid, and $\Delta R$ is the difference in rank, positive or negative.

Outside the chain of command, a different, generally lower, discount (dNCOC) may be applied, possibly with a base discount as compared to all bids within the chain of command (dCOC), i.e., $$B_1 = B_0 \times 10(1 + dCOC + dNCOC \times \Delta R).$$

The discount is applied so that higher ranking officers pay less, while lower ranking officers pay more. Clearly, there is a high incentive for each bid to originate from the highest available commander within the chain of command, and given the effect of the perturbation, for ranking officers to "pull rank" judiciously.

The Modified VCG Auction

A so-called Vickrey-Clarke-Groves, or VCG, auction is a type of auction suitable for bidding, in a single auction, for the goods or services of a plurality of offerors, as a unit. Vickrey, W. (1961). Counterspeculation, auctions, and competitive sealed tenders, Journal of Finance 16, 8-37; Clarke, E. H. (1971). Multipart pricing of public goods, Public Choice 11, 17-33.

In the classic case, each bidder bids a value vector for each available combination of goods or services. The various components and associated ask price are evaluated combinatorially to achieve the minimum sum to meet the requirement. The winning bid set is that which produces the maximum value of the accepted bids, although the second (Vickrey) price is paid. In theory, the Vickrey price represents the maximum state of the network absent the highest bidder, so that each bidder is incentivized to bit its private value, knowing that its pricing will be dependent not on its own value, but the subjective value applied by others. In the present context, each offeror submits an ask price (reserve) or evaluatable value function for a component of the combination. If the minimum aggregate to meet the bid requirement is not met, the auction fails. If the auction is successful, then the set of offerors selected is that with the lowest aggregate bid, and they are compensated that amount.

The VCG auction is postulated as being optimal for allocation of multiple resources between agents. It is "strategyproof" and efficient, meaning that it is a dominant strategy for agents to report their true valuation for a resource, and the result of the optimization is a network which maximizes the value of the system to the agents. Game theory also allows an allocation of cost between various recipients of a broadcast or multicast. That is, the communication is of value to a plurality of nodes, and a large set of recipient nodes may efficiently receive the same information. This allocation from multiple bidders to multiple sellers is a direct extension of VCG theory, and a similar algorithm may be used to optimize allocation of costs and benefit.

The principal issue involved in VCG auctions is that the computational complexity of the optimization grows with the number of buyers and their different value functions and allocations. While various simplifying presumptions may be applied, studies reveal that these simplifications may undermine the VCG premise, and therefore do not promote honesty in reporting the buyer's valuation, and thus are not "strategyproof", which is a principal advantage of the VCG process.

The surplus, i.e., gap between bid and ask, is then available to compensate the deferred bidders. This surplus may be, for example, distributed proportionately to the original bid value of the bidder, thus further encouraging an honest valuation of control over the resource. Thus, if we presume that a bidder may have an incentive to adopt a strategy in which it shaves its bid to lower values, an additional payoff dependent on a higher value bid will promote higher bides and disincentivize shaving. On the other hand, it would be inefficient to promote bidding above a bidder's private value, and therefore care must be exercised to generally avoid this circumstance. In similar manner, potential offerors may be compensated for low bids, to promote availability of supply. It is noted that, by broadcasting supply and demand, fault tolerance of the network is improved, since in the event that an involved node becomes unavailable, a competing node or set of nodes for that role may be quickly enlisted.

The optimization is such that, if any offeror asks an amount that is too high, it will be bypassed in favor of more "reasonable" offerors. Since the bidder pays the second highest price, honesty in bidding the full private value is encouraged. The distribution of the surplus to losing bidders, which exercise deference to the winner, is proportional to the amount bid, that is, the reported value.

In a scenario involving a request for information meeting specified criteria, the auction is complicated by the fact that the information resource content is unknown to the recipient, and therefore the bid is blind, that is, the value of the information to the recipient is indeterminate. However, game theory supports the communication of a value function or utility function, which can then be evaluated at each node possessing information to be communicated, to normalize its value to the requestor. Fortunately, it is a dominant strategy in a VCG auction to communicate a truthful value, and therefore broadcasting the private value function, to be evaluated by a recipient, is not untenable. In a mere request for information conveyance, such as the intermediate transport nodes in a multihop network, or in a cellular network infrastructure extension model, the bid may be a true (resolved) value, since the information content is not the subject of the bidding; rather it is the value of the communications per se, and the bidding node can reasonably value its bid.

Game theory also allows an allocation of cost between various recipients of a broadcast or multicast. That is, in many instances, information which is of value to a plurality of nodes, and a large set of recipient nodes may efficiently receive the same information. This allocation is a direct extension of VCG theory.

Operation of Protocol

The preferred method for acquiring an estimate of the state of the network is through use of a proactive routing protocol. Thus, in order to determine the network architecture state, each node must broadcast its existence, and, for example, a payload of information including its identity, location, itinerary (navigation vector) and "information value function". Typically, the system operates in a continuous set of states, so that it is reasonable to commence the process with an estimate of the state based on prior information. Using an in-band or out-of-band propagation mechanism, this information must propagate to a network edge, which may be physically or artificially defined. If all nodes operate with a substantially common estimation of network topology, only deviations from previously propagated information need be propagated. On the other hand, various nodes may have different estimates of the network state, allowing efficiency gains through exploitation of superior knowledge as compared with seeking to convey full network state information to each node.

A CSMA scheme may be used for the protocol-related communications because it is relatively simple and robust, and well suited for ad hoc communications in lightly loaded networks. We presume that the network is willing to tolerate protocol related inefficiency, and therefore that protocol communications can occur in a lightly loaded network even if the content communications are saturated. An initial node transmits using an adaptive power protocol, to achieve an effective transmit range, for example, of greater than an average internodal distance, but not encompassing the entire network. This distance therefore promotes propagation to a set of nearby nodes, without unnecessarily interfering with communications of distant nodes and therefore allowing this task to be performed in parallel in different regions. Neighboring nodes also transmit in succession, providing sequential and complete protocol information propagation over a relevance range, for example 3-10 maximum range hops.

If we presume that there is a spatial limit to relevance, for example, 5 miles or 10 hops, then the network state propagation may be so limited. Extending the network to encompass a large number of nodes will necessarily reduce the tractability of the optimization, and incur an overhead which may be inefficient. Each node preferably maintains a local estimate of relevance. This consideration is accommodated, along with a desire to prevent exponential growth in protocol-related data traffic, by receiving an update from all nodes within a node's network relevance boundary, and a state variable which represents an estimate of relevant status beyond the arbitrarily defined boundary. The propagation of network state may thus conveniently occur over a finite number of hops, for example 3-10. In a dense population of nodes, such as in a city, even a single maximum range communication may result in a large number of encompassed nodes. On the other hand, in a deserted environment, there may be few or no communications partners, at any time.

Under conditions of relatively high nodal densities, the system may employ a zone strategy, that is, proximate groups of nodes are is treated as an entity or cluster for purposes of external state estimation, especially with respect to distant nodes or zones. In fact, a supernode may be nominated within a cluster to control external communications for that cluster. Such a presumption is realistic, since at extended distances, geographically proximate nodes may be modeled as being similar or inter-related, while at close distances, and particularly within a zone in which all nodes are in direct communication, inter-node communications may be subject to mutual interference, and can occur without substantial external influence. Alternately, it is clear that to limit latencies and communication risks, it may be prudent to bypass nearby and neighboring nodes, thus trading latency for power consumption and overall network capacity. Therefore, a hierarchal scheme may be implemented to geographically organize the network at higher analytical levels, and geographic cells may cooperate to appear externally as a single coordinated entity.

In order to estimate a network edge condition, a number of presumptions must be made. The effect of an inaccurate estimate of the network edge condition typically leads to inefficiency, while inordinate efforts to accurately estimate the network edge condition may also lead to inefficiency. Perhaps the best way to achieve compromise is to have a set of adaptive presumptions or rules, with a reasonable starting point. For example, in a multihop network, one might arbitrarily set a network edge the maximum range of five hops of administrative data using a 95% reliable transmission capability. Beyond this range, a set of state estimators is provided by each node for its surroundings, which are then communicated up to five hops (or the maximum range represented by five hops). This state estimator is at least one cycle old, and by the time it is transferred five hops away, it is at least six cycles old. Meanwhile, in a market economy, each node may respond to perceived opportunities, leading to a potential for oscillations if a time-element is not also communicated. Thus, it is preferred that the network edge state estimators represent a time-prediction of network behavior under various conditions, rather than a simple scalar value or instantaneous function.

For example, each node may estimate a network supply function and a network demand function, liquidity estimate and bid-ask gap for its environment, and its own subjective risk tolerance, if separately reported; the impact of nodes closer than five hops may then be subtracted from this estimate to compensate for redundant data. Further, if traffic routes are identifiable, which would correspond in a physical setting of highways, fixed infrastructure access points, etc., a state estimator for these may be provided as well. As discussed above, nodes may bid not only for their own needs or resources, but also to act as market-makers or merchants, and may obtain long term commitments (futures and/or options) and employ risk reduction techniques (insurance and/or indemnification), and thus may provide not only an estimate of network conditions, but also "guaranty" this state.

A node seeking to communicate within the five hop range needs to consider the edge state estimate only when calculating its own supply and demand functions, bearing in mind competitive pressures from outside. On the other hand, nodes seeking resources outside the five hop range must rely on the estimate, because a direct measurement or acquisition of information would require excess administrative communications, and incur an inefficient administrative transaction. Thus, a degree of trust and reliance on the estimate may ensue, wherein a node at the arbitrary network edge is designated as an agent for the principal in procuring or selling the resource beyond its own sphere of influence, based on the provided parameters. The incentive for a node to provide misinformation is limited, since nodes with too high a reported estimate value lose gains from competitive sale transactions, and indeed may be requested to be buyers, and vice versa. While this model may compel trading by intermediary nodes, if the information communicated accurately represents the network state, an economic advantage will accrue to the intermediary participating, especially in a non-power constrained, unlicensed spectrum node configuration.

It should be borne in mind that the intended administration of the communications is an automated process, with little human involvement, other than setting goals, risk tolerance, cost constraints, etc. In a purely virtual economy with temporally declining currency value, the detriment of inaccurate optimizations is limited to reduced nodal efficiency, and with appropriate adaptivity, the system can learn from its "mistakes". (A defined decline in currency value tends to define the cost constraints for that node, since wealth cannot be accumulated nor overspent).

A supernode within a zone may be selected for its superior capability, or perhaps a central location. The zone is defined by a communication range of the basic data interface for communications, with the control channel preferably having a longer range, for example at least double the normal data communications range. Communications control channel transmitters operate on a number of channels, for example at least 7, allowing neighboring zones in a hexagonal tiled array to communicate simultaneously without interference. In a geographic zone system, alternate zones which would otherwise be interfering may use an adaptive multiplexing scheme to avoid interference. All nodes may listen on all control channels, permitting rapid analysis and propagation of control information. As discussed elsewhere herein, directional antennas of various types may be employed, although it is preferred that out-of-band control channels employ omnidirectional antennas, having a generally longer range (and lower data bandwidth) than the normal data communications channels, in order to have a better chance to disseminate the control information to potentially interfering sources, and to allow coordination of nodes more globally.

In order to effectively provide decentralized control, either each node must have a common set of information to allow execution of an identical control algorithm, or nodes defer to the control signals of other nodes without internal analysis for optimality. A model of semi-decentralized control is also known, in which dispersed supernodes are nominated as master, with other topologically nearby nodes remaining as slave nodes. In the pure peer network, relatively complete information conveyance to each node is required, imposing a relatively high overhead. In a master-slave (or supernode) architecture, increased reliance on a single node trades-off reliability and robustness (and other advantages of pure peer-to-peer networks) for efficiency. A supernode within a cellular zone may be selected for its superior capability, or perhaps is at a central location or is immobile.

Once each control node (node or supernode) has an estimate of network topology, the next step is to optimize network channels. According to VCG theory, each agent has an incentive to broadcast its truthful value or value function for the scarce resource, which in this case, is control over communications physical layer, and or access to information. This communication can be consolidated with the network discovery transmission. Each control node then performs a combinatorial solution to select the optimum network configuration from the potentially large number of possibilities, which may include issues of transmit power, data rate, path, timing, reliability and risk criteria, economic and virtual economic costs, multipath and redundancy, etc., for the set of simultaneous equations according to VCG theory (or extensions thereof). This solution should be consistent between all nodes, and the effects of inconsistent solutions may be resolved by collision sensing, and possibly an error/inconsistency detection and correction algorithm specifically applied to this type of information. Thus, if each node has relatively complete information, or accurate estimates for incomplete information, then each node can perform the calculation and derive a closely corresponding solution, and verify that solutions reported by others are reasonably consistent to allow or promote reliance thereon.

As part of the network mapping, communications impairment and interference sources are also mapped. GPS assistance may be particularly useful in this aspect. Where network limitations are caused by interfering communications, the issue is a determination of a strategy of deference or competition. If the interfering communication is continuous or unresponsive, then the only available strategy is competition. On the other hand, when the competing system uses, for example, a CSMA system, such as 802.11, competition with such a communication simply leads to retransmission, and therefore ultimately increased network load, and a deference strategy may be more optimal, at least and until it is determined that the competing communication is incessant. Other communications protocols, however, may have a more or less aggressive strategy. By observation of a system over time, its strategies may be revealed, and game theory permits composition of an optimal strategy to deal with interference or coexistence. It is noted that this strategy may be adopted adaptively by the entire ad hoc network, which may coordinate deference or competition as determined optimal.

The optimization process produces a representation of optimal network architecture during the succeeding period. That is, value functions representing bids are broadcast, with the system then being permitted to determine an optimal real valuation and distribution of that value. Thus, prior to completion of the optimization, potentially inconsistent allocations must be prevented, and each node must communicate its evaluation of other node's value functions, so that the optimization is performed on a normalized economic basis. This step may substantially increase the system overhead, and is generally required for completion of the auction. This valuation may be inferred, however, for intermediate nodes in a multihop network path, since there is little subjectivity for nodes solely in this role, and the respective value functions may be persistent. For example, the valuation applied by a node to forward information is generally independent of content and involved party.

A particular complication of a traffic information system is that the nature of the information held by any node is private to that node (before transmission), and therefore the valuation is not known until after all bids are evaluated. Thus, prior to completion of optimization, each node must communicate its evaluation of other nodes' value functions, so that the optimization is performed on an economic basis. This required step substantially increases the system overhead. This valuation may be inferred, however, for transit nodes in a multihop network path.

As discussed above, may of the strategies for making the economic markets more efficient may be employed either directly, or analogy, to the virtual economy of the ad hoc network. The ability of nodes to act as market maker and derivative market agents facilitates the optimization, since a node may elect to undertake a responsibility (e.g., transaction risk), rather than relay it to others, and therefore the control/administrative channel chain may be truncated at that point. If the network is dense, then a node which acts selfishly will be bypassed, and if the network is sparse, the node may well be entitled to gain transactional profit by acting as a principal and trader, subject to the fact that profits will generally be suboptimal if pricing is too high or too low.

After the network architecture is defined, compensation is paid to those nodes providing value or subjected to a burden (including foregoing communication opportunity) by those gaining a benefit. The payment may be a virtual currency, with no specific true value, and the virtual currency system provides a convenient method to flexibly tax, subsidize, or control the system, and thus steer the virtual currency to a normalized extrinsic value. In a real currency system, external controls are more difficult, and may have unintended consequences. A hybrid economy may be provided, linking both the virtual and real currencies, to some degree. This is especially useful if the network itself interfaces with an outside economy, such as the cellular telephony infrastructure (e.g., 2G, 2.5G, 3G, 4G, proposals for 5G, WiFi (802.11x) hotspots, WiMax (802.16x), etc.)

Using the protocol communication system, each node transmits its value function (or change thereof), passes through communications from neighboring nodes, and may, for example transmit payment information for the immediate-past bid for incoming communications.

Messages are forwarded outward (avoiding redundant propagation back to the source), with messages appended from the series of nodes. Propagation continues for a finite number of hops, until the entire community has an estimate of the state and value function of each node in the community. Advantageously, the network beyond a respective community may be modeled in simplified form, to provide a better estimate of the network as a whole. If the propagation were not reasonably limited, the information would be stale by the time it is employed, and the system latency would be inordinate. Of course, in networks where a large number of hops are realistic, the limit may be time, distance, a counter or value decrement, or other variable, rather than hops. Likewise, the range may be adaptively determined, rather than predetermined, based on some criteria.

After propagation, each node evaluates the set of value functions for its community, with respect to its own information and ability to forward packets. Each node may then make an offer to supply or forward information, based on the provided information. In the case of multihop communications, the offers are propagated to the remainder of the community, for the maximum number of hops, including the originating node. At this point, each node has a representation of the state of its community, with community edge estimates providing consistency for nodes with differing community scopes, the valuation function each node assigns to control over portions of the network, as well as a resolved valuation of each node for supplying the need. Under these circumstances, each node may then evaluate an optimization for the network architecture, and come to a conclusion consistent with that of other members of its community. If supported, node reputation may be updated based on past performance, and the reputation applied as a factor in the optimization and/or externally to the optimization. As discussed above, a VCG-type auction is employed as a basis for optimization. Since each node receives bid information from all other nodes within the maximum node count, the VCG auction produces an optimized result.

As discussed above, by permitting futures, options, derivatives, insurance/indemnification/guaranties, long and short sales, etc., the markets may be relatively stabilized as compared to a simple set of independent and sequential auctions, which may show increased volatility, oscillations, chaotic behavior, and other features which may be inefficient.

Transmissions are preferably made in frames, with a single bidding process controlling multiple frames, for example a multiple of the maximum number of hops. Therefore, the bid encompasses a frame's-worth of control over the modalities. In the event that the simultaneous use of, or control over, a modality by various nodes is not inconsistent, then the value of the respective nodes may be summed, with the resulting allocation based on, for example, a ratio of the respective value functions. As a part of the optimization, nodes are rewarded not only for supporting the communication, but also for deferring their own respective communications needs. As a result, after controlling the resources, a node will be relatively less wealthy and less able to subsequently control the resources, while other nodes will be more able to control the resources. The distribution to deferred nodes also serves to prevent pure reciprocal communications, since the proposed mechanism distributes and dilutes the wealth to deferring nodes.

Another possible transaction between nodes is a loan, that is, instead of providing bandwidth per se, one node may loan a portion of its generator function or accumulated wealth to another node. Presumably, there will be an associated interest payment. Since the currency in the preferred embodiment is itself defined by an algorithm, the loan transaction may also be defined by an algorithm. While this concept is somewhat inconsistent with a virtual currency which declines in value over time and/or space, it is not completely inconsistent, and, in fact, the exchange may arbitrage these factors, especially location-based issues.

Because each node in the model presented above has complete information, for a range up to the maximum node count, the wealth of each node can be estimated by its neighbors, and payment inferred even if not actually consummated. (Failure of payment can occur for a number of reasons, including both malicious and accidental). Because each hop adds significant cost, the fact that nodes beyond the maximum hop distance are essentially incommunicado is typically of little consequence; since it is very unlikely that a node more than 5 or 10 hops away will be efficiently directly included in any communication, due to the increasing cost with distance, as well as reduction in reliability and increase in latency. Thus, large area and scalable networks may exist.

Communications are generally of unencrypted data. Assuming the network is highly loaded, this may allow a node to incidentally fulfill its data requirements as a bystander, and thus at low cost meet its needs, allowing nodes with more urgent or directed needs to both control and compensate the network. While this may reduce compensation to intermediaries and data sources, the improvements in efficiency will likely benefit the network as a whole in increase stability, since we assume that peak load conditions will occur frequently.

Enforcement of responsibility may be provided by a centralized system which assures that the transactions for each node are properly cleared, and that non-compliant nodes are either excluded from the network or at least labeled. While an automated clearinghouse which periodically ensures nodal compliance is preferred, a human discretion clearinghouse, for example presented as an arbitrator or tribunal, may be employed.

It is clear that, once an economic optimization methodology is implemented, various factors may be included in the optimization, as set forth in the Summary and Objects of the invention and claims. Likewise, the optimization itself may have intrinsic limitations, which may create arbitrage opportunities. One set of embodiments of the present invention encourages such arbitrage as a means for efficiently minimizing perturbations from optimality—as the model deviance from reality creates larger arbitrage opportunities, there will be a competitive incentive for recruitment of agents as arbitragers, and also an incentive to create and implement better models. The resulting equilibrium may well be more efficient than either mechanism alone.

The Synthetic Economy

Exerting external economic influences on the system may have various effects on the optimization, and may exacerbate differences in subjective valuations. The application of a monetary value to the virtual currency substantially also increases the possibility of misbehavior and external attacks. On the other hand, a virtual currency with no assessed real value is self-normalizing, while monetization leads to external and generally irrelevant influences as well as possible external arbitrage (with potential positive and negative effects). External economic influences may also lead to benefits, which are discussed in various publications on non-zero sum games.

In order to provide fairness, the virtual currency (similar to the so-called "nuglets" or "nugglets" proposed for use in the Terminodes project) is self-generated at each node according to a schedule, and itself may have a time dependent value. L. Blazevic, L. Buttyan, S. Capkun, S. Giordiano, J.-P. Hubaux, and J.-Y. Le Boudec. Self-organization in mobile ad-hoc networks: the approach of terminodes. IEEE Communications Magazine, 39(6): 166-174, June 2001; M. Jakobsson, J. P. Hubaux, and L. Buttyan. A micro-payment scheme encouraging collaboration in multi-hop cellular networks. In Proceedings of Financial Crypto 2003, January 2003; J. P. Hubaux, et al., "Toward Self-Organized Mobile Ad Hoc Networks: The Terminodes Project", IEEE Communications, 39(1), 2001. citeseer.ist.psu.edu/hubaux01toward.html; Buttyan, L., and Hubaux, J.-P. Stimulating Cooperation in Self-Organizing Mobile Ad Hoc Networks. Tech. Rep. DSC/citeseer.ist.psu.edu/buttyan01stimulating.html; Levente Buttyan and Jean-Pierre Hubaux, "Enforcing Service Availability in Mobile Ad-Hoc WANs", 1st IEEE/ACM Workshop on Mobile Ad Hoc Networking and Computing (MobiHOC citeseer.ist.psu.edu/buttyan00enforcing.html; L. Buttyan and J.-P. Hubaux. Nuglets: a virtual currency to stimulate cooperation in self-organized ad hoc networks. Technical Report DSC/2001, citeseer.ist.psu.edu/article/buttyan01nuglets.html; Mario Cagalj, Jean-Pierre Hubaux, and Christian Enz. Minimum-energy broadcast in all-wireless networks: Np-completeness and distribution issues. In The Eighth ACM International Conference on Mobile Computing and Networking (MobiCom 2002), citeseer.ist.psu.edu/cagalj02minimumenergy.html; N. Ben Salem, L. Buttyan, J. P. Hubaux, and Jakobsson M. A charging and rewarding scheme for packet forwarding. In Proceeding of Mobihoc, June 2003. For example, the virtual currency may have a half-life or temporally declining value. On the other hand, the value may peak at a time after generation, which would encourage deference and short term savings, rather than immediate spending, and would allow a recipient node to benefit from virtual currency transferred before its peak value. This also means that long term hoarding of the currency is of little value, since it will eventually decay in value, while the system presupposes a nominal rate of spending, which is normalized among nodes. The variation function may also be adaptive, but this poses a synchronization issue for the network. An external estimate of node wealth may be used to infer counterfeiting, theft and failure to pay debts, and to further effect remediation.

The currency is generated and verified in accordance with micropayment theory. Rivest, R. L., A. Shamir, PayWord and MicroMint: Two simple micropayment schemes, also presented at the RSA '96 conference, http//theory.lcs.mit.edu/rivest/RivestShamirmpay.ps, citeseer.ist.psu.edu/rivest96payword.html; Silvio Micali and Ronald Rivest. Micropayments revisited. In Bart Preneel, editor, Progress in Cryptology—CT-RSA 2002, volume 2271 of Lecture Notes in Computer Science. Springer-Verlag, February 18-22 2002. citeseer.ist.psu.edu/micali02micropayments.html.

Micropayment theory generally encompasses the transfer of secure tokens (e.g., cryptographically endorsed information) having presumed value, which are intended for verification, if at all, in a non-real time transaction, after the transfer to the recipient. The currency is circulated (until expiration) as a token, and therefore may not be subject to immediate definitive authentication by source. Since these tokens may be communicated through an insecure network, the issue of forcing allocation of payment to particular nodes may be dealt with by cryptographic techniques, in particular public key cryptography, in which the currency is placed in a cryptographic "envelope" (cryptolope) addressed to the intended recipient, e.g., is encrypted with the recipient's public key, which must be broadcast and used as, or in conjunction with, a node identifier. This makes the payment unavailable to other than the intended recipient. The issue of holding the encrypted token hostage and extorting a portion of the value to forward the packet can be dealt with by community pressure, that is, any node presenting this (or other undesirable) behavior might be ostracized. The likelihood of this type of misbehavior is also diminished by avoiding monetization of the virtual currency. Further, redundant routing of such information may prevent single-node control over such communications.

This currency generation and allocation mechanism generally encourages equal consumption by the various nodes over the long term. In order to discourage excess consumption of bandwidth, an external tax may be imposed on the system, that is, withdrawing value from the system based on usage. Clearly, the effects of such a tax must be carefully weighed, since this will also impose an impediment to adoption as compared to an untaxed system. On the other hand, a similar effect use-disincentive may be obtained by rewarding low consumption, for example by allocating an advertising subsidy between nodes, or in reward of deference. The external tax, if associated with efficiency-promoting regulation, may have a neutral or even beneficial effect.

Each node computes a value function, based on its own knowledge state, risk profile and risk tolerance, and wealth, describing the value to it of additional information, as well as its own value for participating in the communications of others. The value function typically includes a past travel history, future travel itinerary, present location, recent communication partners, and an estimator of information strength and weakness with respect to the future itinerary. It may be presumed that each node has a standard complement of sensors, and accurately acquired descriptive data for its past travel path. Otherwise, a description of the available information is required. One advantage of a value function is that it changes little over time, unless a need is satisfied or circumstances change, and therefore may be a persistent attribute. Using the protocol communication system, each node transmits its value function (or change thereof), passes through communications from neighboring nodes, and may, for example transmit payment information for the immediate-past bid for incoming communications.

Messages are forwarded outward (avoiding redundant propagation back to the source), with messages appended from the series of nodes. Propagation continues for a finite number of hops, until the entire community has an estimate of the state and value function of each node in the community. Advantageously, the network beyond a respective community may be modeled in simplified form, to provide a better estimate of the network as a whole.

After propagation, each node evaluates the set of value functions for its community, with respect to its own information and ability to forward packets. Each node may then make an offer to supply or forward information, based on the provided information. In the case of multihop communications, the offers are propagated to the remainder of the community, for the maximum number of hops, including the originating node. At this point, each node has a representation of the state of its community, with community edge estimates providing consistency for nodes with differing community scopes, the valuation function each node assigns to control over portions of the network, as well as a resolved valuation of each node for supplying the need. Under these circumstances, each node may then evaluate an optimization for the network architecture, and come to a conclusion consistent with that of other members of its community. If supported, node reputation may be updated based on past performance, and the reputation applied as a factor in the optimization and/or externally to the optimization. As discussed above, a VCG-type auction is employed as a basis for optimization. Since each node receives bid information from all other nodes within the maximum node count, the VCG auction produces an optimized result.

Transmissions are made in frames, with a single bidding process controlling multiple frames, for example a multiple of the maximum number of hops. Therefore, the bid encompasses a frame's-worth of control over the modalities. In the event that the simultaneous use of, or control over, a modality by various nodes is not inconsistent, then the value of the respective nodes may be summed, with the resulting allocation based on, for example, a ratio of the respective value functions. As a part of the optimization, nodes are rewarded not only for supporting the communication, but also for deferring their own respective needs. As a result, after controlling the resources, a node will be relatively less wealthy and less able to subsequently control the resources, while other nodes will be more able to control the resources. The distribution to deferred nodes also serves to prevent pure reciprocal communications, since the proposed mechanism distributes and dilutes the wealth to deferring nodes.

Because each node in the model presented above has complete information, for a range up to the maximum node count, the wealth of each node can be estimated by its neighbors, and payment inferred even if not actually consummated. (Failure of payment can occur for a number of reasons, including both malicious and accidental). Because each hop adds significant cost, the fact that nodes beyond the maximum hop distance are essentially incommunicado is typically of little consequence; since it is very unlikely that a node more than 5 or 10 hops away will be efficiently included in any communication, due to the increasing cost with distance, as well as reduction in reliability and increase in latency. Thus, large area and scalable networks may exist.

Typically, cryptography is employed for both authentication and to preserve privacy. External regulation, in a legal sense at least, is typically imposed by restrictions on hardware and software design, as well as voluntary compliance at risk of detection and legal sanction.

A synthetic economy affords the opportunity to provide particular control over the generator function, which in turn supports a hierarchy. In this scheme, each node controls the generator function at respectively lower nodes, and thus can allocate wealth among subordinates. If one assumes real time communications, then it is clear that the superordinate node can directly place bids on behalf of subordinates, thus effectively controlling its entire branch. In the absence of real time communications, the superordinate node must defer to the discretion of the subordinate, subject to reallocation later if the subordinate defects. If communications are impaired, and a set of a priori instructions are insufficient, then it is up to the subjective response of a node to provide deference.

It is noted that when sets of nodes "play favorites", the VCG auction will no longer be considered "strategyproof". The result is that bidders will assume bidding strategies that do not express their secret valuation, with the result being likely suboptimal market finding during the auction. This factor can be avoided if hierarchal overrides and group bidding play only a small role in the economy, and thus the expected benefits from shaded bidding are outweighed by the normal operation of the system. For example, by taxing transactions, over-valued bidding will be disincentivized, and by redistributing economic surplus to bystanders, the aggregate wealth of the controlling group will be mitigated.

A synthetic economy affords the opportunity to provide particular control over the generator function, which in turn provides particular advantages with respect to a hierarchal organization. In this scheme, each node has the ability to control the generator function at respectively lower nodes, and thus can allocate wealth among subordinates. If one assumes real time communications, then it is clear that the superordinate node can directly place bids on behalf of subordinates, thus effectively controlling its entire branch. In the absence of real time communications, the superordinate node must defer to the discretion of the subordinate, subject to reallocation later if the subordinate defects. If communications are impaired, and a set of a priori instructions are insufficient, then it is up to the subjective response of a node to provide deference. Thus, a node may transfer all or a portion of its generator function, either for a limited time or permanently, using feed-forward or feedback control. In this sense, the hierarchal and financial derivatives, options, futures, loans, etc. embodiments of the invention share a common theme.

It is noted that when sets of nodes "play favorites", the VCG auction will no longer be considered "strategyproof". The result is that bidders will assume bidding strategies that do not express their secret valuation, with the result being likely suboptimal market price finding during the auction. This factor can be avoided if hierarchal overrides and group bidding play only a small role in the economy, and thus the expected benefits from shaded bidding are outweighed by the normal operation of the system. On the other hand, the present invention potentially promotes competition within branches of a hierarchy, to the extent the hierarchy does not prohibit this. Between different branches of a hierarchy, there will generally be full competition, while within commonly controlled branches of a hierarchy, cooperation will be expected. Since the competitive result is generally more efficient, there will be incentive for the hierarchal control to permit competition as a default state, asserting control only where required for the hierarchal purpose.

Military Hierarchy

In a typical auction, each player is treated fairly; that is, the same rules apply to each player, and therefore a single economy describes the process. The fair auction therefore poses challenges for an inherently hierarchal set of users, such as a military organization. In the military, there is typically an expectation that "rank has its privileges". The net result, however, is a decided subjective unfairness to lower ranking nodes. In a mobile ad hoc network, a real issue is user defection or non-compliance. For example, where a cost is imposed on a user for participating in the ad hoc network, e.g., battery power consumption, if the anticipated benefit does not exceed the cost, the user will simply turn off the device until actually needed, to conserve battery power outside the control of the network. The result of mass defection will of course be the instability and failure of the ad hoc network itself. Thus, perceived fairness and net benefit is required to important for network success, assuming that defection or non-compliance remains possible.

On the other hand, in military systems, the assertion of rank as a basis for priority is not necessarily perceived as arbitrary and capricious, and is generally not perceived subjectively as such. Orders and communications from a central command are critical for the organization itself. Therefore, the difficulty in analyzing the application of a fair game to a hierarchal organization is principally a result of conceptualizing and aligning the individual incentives with those of the organization as a whole. Since the organization exists outside of the ad hoc network, it is generally not unrealistic to expect compliance with the hierarchal attributes both within and outside of the network.

An artificial economy provides a basis for an economically efficient solution. In this economy, each node has a generator function for generating economic units which are used in a combinatorial auction with other nodes. The economic units may have a declining value, so that wealth does not accumulate over long periods, and by implication, wealth accumulated in one region is not available for transfer in a distant region, since the transfer may be subject to latency and/or cost. Even if a low latency system is employed to transfer the value, an express spatially declining value function may also be imposed. The geographic decline may also be explicit, for example based on a GPS or navigational system. In other cases, nodal motility is valuable, and mobile nodes are to be rewarded over those which are stationary. Therefore, the value or a portion thereof, or the generator function, may increase with respect to relocations.

This scheme may be extended to the hierarchal case by treating each chain of command as an economic unit with respect to the generator function. At any level of the hierarchy, the commander retains a portion of the wealth generation capacity, and delegates the remainder to its subordinates. In the case of real-time communications, a commander may directly control allocation of the generator function at each time period. Typically, there is no real-time communications capability, and the wealth generator function must be allocated a priori. Likewise, wealth may also be reallocated, although a penalty is incurred in the event of an initial misallocation since the transfer itself incurs a cost, and there will be an economic competitive distortion, under which a node's subjective value of a resource is influenced by its subjective wealth. If a node is supplied with wealth beyond its needs, the wealth is wasted, since it declines in value and cannot be hoarded indefinitely. If a node is supplied with insufficient wealth, economic surplus through transactional gains are lost. Thus, each node must analyze its expected circumstances to retain or delegate the generator function, and to optimally allocate wealth between competing subordinates.

In any transaction, there will be a component which represents the competitive "cost", and a possible redistribution among nodes within a hierarchal chain. This redistribution may be of accumulated wealth, or of the generation function portion. In the former case, if the communication path fails, no further transfers are possible, while in the later case, the result is persistent until the transfer function allocation is reversed. It is also possible to transfer an expiring or declining portion of the generating function; however, this might lead a node which is out of range to have no ability to rejoin the network upon return, and thus act as an impediment to efficient network operation. As discussed above, one possibility is for nodes to borrow or load currency. In this case, a node deemed credit-worthy may blunt the impact of initially having insufficient wealth by merely incurring a transaction cost (including interest, if applied).

In practice, the bulk of the wealth generating function will be widely distributed, and not concentrated at the top of the hierarchy. If this is true, under most circumstances, the network will appear to operate according to a non-hierarchal or fair VCG model, but in some circumstances, normal operation may be usurped by nodes which have apparent excess wealth resulting from a superior wealth generator function. Typically, hierarchically superior nodes will use their ability to transfer wealth to themselves, or to recruit subordinates to cooperate, in order to directly or indirectly control the network resources. It is possible, however, for nodes within one branch of a hierarchy to conspire against nodes outside that branch, resulting in a different type of distortion. Since the ad hoc network typically gains by having a larger number of participating nodes, this type of behavior may naturally be discouraged. On the other hand, hierarchically superior nodes either retain, or more likely, can quickly recruit surrounding subordinates to allocate their wealth generating function and accumulated wealth to pass urgent or valuable messages.

Where expensive assets are employed, an actual transfer of wealth or the generator function to a single entity may be required. For example, a high level node might have access to a high power broadcast system, which interferes with other communications, or simply incurs a high cost to operate. Low level nodes might ordinarily be limited to cellular (i.e., short range, low power radio) wireless communications. In order for a low level node to control an expensive asset, the assent or cooperation of others may be required, for example by hierarchal superiors.

Since the network should be stable in the absence of command and control communications, a hierarchal superior should assure that subordinate nodes possess sufficient wealth and motivation to maintain ad hoc network operation. Insufficient wealth will tend to eliminate the advantage to nodal participation (and therefore encourage defection), unless payments from acting as intermediary are significant. Thus, a node with insufficient wealth generation function may potentially exhaust its resources, and be unavailable for ad hoc intermediary use, even for the benefit of the hierarchy. On the other hand, an initial allocation of too much wealth will encourage high spending and less active participation as an intermediary. While it is possible in a military system to formulate an "engineered" solution which forces participation and eliminates defection, this solution does not gain the benefit of economic optimization and may have limited application outside of mandatory hierarchies.

Game theory is a useful basis for analyzing ad hoc networks, and understanding the behavior of complex networks of independent nodes. By presuming a degree of choice and decision-making by nodes, we obtain an analysis that is robust with respect to such considerations. The principal issues impeding deployment are the inherent complexity of the system, as well as the overhead required to continuously optimize the system. Determination of a set of simplifying presumptions to reduce protocol overhead and reduce complexity may improve performance. Hierarchal considerations can be imposed to alter the optimization of the system, which would be expected to provide only a small perturbation to the efficient and optimal operation of the system according to a pure VCG protocol. A marketplace auction with competition between potential buyers and potential sellers, and with the economic surplus distributed between parties which must defer to active participants, provides incentive to all affected parties, and therefore may provide a better result than a simple transfer between supply and demand elements only.

The ad hoc network does not exist in a vacuum. There are various competing interests seeking to use the same bandwidth, and technological superiority alone does not assure dominance and commercial success. Game theory may also be used as a tool to analyze the entities which seek to deploy ad hoc networks, especially where they compete.

First Embodiment

In a typical auction, each player is treated fairly; that is, the same rules apply to each player, and therefore a single economy describes the process. The fair auction therefore poses challenges for an inherently hierarchal set of users, such as a military organization, where rank is accompanied by privilege. The net result, however, is a decided apparent disadvantage to lower ranking agents, at least when viewed in light of constricted self-interest. The issues that arise are similar to the relating to "altruism", although not identical, and thus the game theoretic analysis of altruistic behavior may be imported for consideration, as appropriate.

In a mobile ad hoc communications network, a real issue is user defection or non-compliance. For example, where a cost is imposed on a user for participating in the ad hoc network, e.g., battery power consumption in a mesh radio network, if the anticipated benefit does not exceed the cost, the user will simply turn off or disable the device until actually needed. The result of mass defection will, of course, be the instability and failure of the ad hoc network itself, leading to decreased utility, even for those who gain an unfair or undue advantage under the system. Thus, perceived fairness and net benefit is required for network success, assuming that defection and/or non-compliance are possible.

On the other hand, in military systems, the assertion of rank as a basis for priority is not itself necessarily arbitrary or capricious. Orders and communications from a central command are critical for the organization itself, and thus the lower ranking agents gain at least a peripheral, if not direct benefit as their own chain of command employs their resources. Therefore, the difficulty in analyzing the application of a fair game paradigm to a hierarchal organization is principally a result of conceptualizing and aligning the individual incentives with those of the organization as a whole and the relationship between branches. Thus, in contradistinction to typical self-organizing peer-to-peer networks, a hierarchal network is not seen as self-organizing, at least in terms of the hierarchy, which is extrinsic to the formation of the communications network under consideration.

As discussed below, the "distortions" of the network imposed by the external hierarchy can be analyzed and accounted for by, for example, the concepts of inheritance and delegation. Thus, each branch of a hierarchy tree may be considered an object, which receives a set of characteristics from its root, and from which each sub-branch inherits the characteristics and adds subcharacteristics of, for example, specialization. It is noted that the hierarchy need not follow non-ambiguous or perfect rules, and thus there is no particular limit imposed that the hierarchy necessarily follow these formalisms. Rather, by analyzing those aspects of the hierarchy which comply with these formalisms in accordance therewith, efficiency is facilitated.

In establishing an economic system, a preliminary question is whether the system is microeconomic or macroeconomic; that is, whether the economy is linked to a real economy or insulated from it. One disadvantage of a real economy with respect to a peer relationship is that external wealth can override internal dynamics, thus diminishing the advantages to be gained by optimization, and potentially creating a perception of unfairness for externally less wealthy agents, at least unless and until the system accomplishes a wealth redistribution. An artificial economy provides a solution for a peer network in which each node has an equal opportunity to gain control over the ad hoc network, independent of outside influences and constraints. On the other hand, by insulating the network from external wealth redistribution, real efficiency gains may be unavailable. Therefore, both types of economies, as well as hybrids, are available. Thus, as discussed in more detail below, a "fair" initial (or recurring) wealth distribution may be applied, which may be supplemented with, and/or provide an output of, external wealth. The rules or proportion of external influence may be predetermined, adaptive, or otherwise.

In accordance with the proposed artificial economy, each node has a generator function for generating economic units, which are then used in a transaction (e.g., an auction) with other nodes to create a market economy, that is, each node has a supply and demand function, and acts as a source or sink for a limited resource. In some cases, nodes may have only supply or demand functions, or a degree of asymmetry, but in this case, these are typically subject to an external economic consideration, and the artificial economy will be less effective in providing appropriate incentives. According to one implementation of this embodiment, the artificial economic units have a temporally and/or spatially declining value, so that wealth does not accumulate over long periods and/or cannot be transferred over large distances. The decline may be linear, exponential, or based on some other function. This creates a set of microeconomies insulated from each other. Where distant microeconomies must deal with each other, there is a discount. This architecture provides a number of advantages, for example, by decreasing the influence of more spatially and temporally distant effects, the scope of an optimization analysis may be relatively constrained, while reducing the amount of information which must be stored over time and/or carried over distance in order to permit an optimization. Likewise, since the economy is artificial, the discount need not be recouped within the scope of the system; that is, conservation of capital is not required. In the same manner, a somewhat different incentive structure may be provided; that is, economic units generated at one location and at one time may have a higher value at a different location and time; this may encourage reduced immediate use of the system resources, and relocation to higher valued locations. As discussed below, one embodiment of the invention permits trading of credits, and thus, for example, a user may establish a repeater site at an under-served location to gain credits for use elsewhere. Preferably, beyond a "near field" effect, the value does not continue to increase, since this may result in inflationary pressures, and undermine the utility of the system in optimally balancing immediate supply and demand at a particular location.

As can be seen, through modifications of the governing rules and formulae, the system can be incentivized to behave in certain ways, but care should be exercised since a too narrow analysis of the incentive might result in unintended long term or distant effects. To the extent that human behavior and subjective analysis is involved, care should also be exercised in applying a rationality assumption, since this is not always true. Rather, there may be applicable models for human irrational behavior that are better suited to an understanding of the network behavior in response to a perturbation.

The typical peer-to-peer ad hoc network may be extended to the hierarchal case by treating each branch (including sub-branches) within the chain of command as an economic unit with respect to the generator function. At any level of the hierarchy, the commander optionally retains a portion of the wealth generation capacity, and delegates the remainder to its subordinates. Therefore, the rank and hierarchal considerations are translated to an economic wealth (or wealth generation) distribution. One aspect of this system allows wealth transfer or redistribution, although in a real system, a time delay is imposed, and in the event of a temporally and/or spatially declining value, the transfer will impose a cost. Thus, an initial misallocation is undesired, and there will be an incentive to optimally distribute the wealth initially. Of course, if centralized control with low penalty is desired, it is possible to limit the penalty, if any, for wealth redistribution through appropriate rules, although the time for propagation through the network remains an issue, and blind nodes (i.e., those which do not have an efficient communication path, or have insufficient resources to utilize otherwise available paths through the hierarchy) may also lead to limitations on system performance.

In this system, there may be an economic competitive distortion, under which a node's subjective value of a resource is influenced by its then subjective wealth. If a node is supplied with wealth beyond its needs, the wealth is wasted, since it may decline in value and cannot be hoarded indefinitely. (In a network wealth model in which wealth could be hoarded indefinitely, small deviations from optimality and arbitrage opportunities may be exploited to create a perception of unfairness, thus, this is not preferred.) If a node is supplied with insufficient wealth, economic surplus through transactional gains are lost. Thus, each node must analyze its expected circumstances to retain or delegate the generator function, and to optimally allocate wealth between competing subordinates. Likewise, there may be a plurality of quasi-optimal states.

In any economic transaction, there is an amount that a seller requires to part with the resource, a price a buyer is willing to pay, and a surplus between them. Typically, in a two party transaction, the surplus is allocated to the party initiating the transaction, that is, the party initiating the transaction uses some discovery mechanism to find the minimum price acceptable by the buyer. In brokered or agent-mediated transactions, a portion of the surplus is allocated to a facilitator.

In accordance with one aspect of the present invention, compliance with the community rules, as well as an incentive to bid or ask a true private value is encouraged by distributing a portion of the transaction surplus to losing competitive bidders. While according to one proposal, this portion is allocated in accordance with their reported valuations, this creates a potential incentive for bidders who know they will not be winning bidders to overbid, and thereby gain an increased portion of the surplus. In order to reward honest reporting of private values, the reward function must penalize both overreporting and underreporting of private values. This circumstance occurs if, at each bid, there is a risk of winning commensurate with the bid, and thus the system is strategyproof. In order to achieve this circumstance, for example, a statistical noise or probability distribution may be added to the system, with an acceptance of a bid made a statistical process. This results in a "fuzzy" boundary on the bid value, although it may impose an inefficiency on the market since any deviation from the optimal market price represents a loss.

Another approach to minimizing strategic bidding is to impose a bid fee. That is, each bidder must offer a prepayment corresponding to a small portion of its bid, thereby disincentivizing bidding to lose. The winning bidder will then pay a second price plus the deposit bid. The sellers will receive their own lowest cost (or second cost) bid. Losing bidders will receive a payment in accordance with the value of their bid, less the bid deposit. In order to disincentivize strategic bidding, the average return to a bidder is less than the bid cost. In fact, a good target for the bidder deposit is the administrative cost of transacting the bidding negotiations. This, in turn, provides an incentive to keep the administrative overhead low, thus improving overall system performance, especially where the administrative communications compete with normal communications for bandwidth. In this circumstance, those bidding to win receive either the benefit of the transaction or a payment for deference, less the transactional fee. Those who are bidding strategically, in manner seeking to acquire the deference payment, must risk the transactional cost, and to gain substantially, must submit a relatively high bid. When the bids are "competitive", there is a substantial risk that the bid will be a winning bid, and thus incur the full bid cost. Thus, there is a disincentive to bidding a high value, but without an intent to win. Of course, the bid deposit may be a flat fee, or subject to a mathematical or adaptive function, rather than directly related to administrative cost.

The aggregated bid deposits may, for example, be awarded to a class who are optimally incentivized by the nature of this payment. For example, it may be awarded to those selling bandwidth, in a manner generally inversely proportional to the value of their ask, or, for example, based on allocations during the combinatorial (VCG) auction. This payment would then incentivize sellers to offer services at a low price, improving network availability.

Of course, there may be other classes within the auction population who may be taxed or subsidized, using value derived from the auction process.

In a strategyless auction, automated bidding is quite feasible, since the optimal bid is the computed value. For auctions in which a bidder does not have an incentive to bid its true private value, and this must assume a strategic play, automated bidding becomes more of a challenge, but may also be automated.

In a strategy-less auction, a bidder cannot gain by bidding over or under its private value. If a bidder bids below its private value, it has a reduced chance of gaining the benefit of the transaction.

In an auction which is subject to strategic bidding, the strategy may be mitigated by imposing commensurate risks and costs to balance the perceived advantage toward zero.

In particular, the competitive bidders seeking to allocate a scarce resource for themselves receive compensation for deferring to the winning bidder in an amount commensurate with their reported value. Thus, sellers receive their minimum acceptable value, buyers pay their maximum valuation, the surplus is distributed to the community in a manner tending to promote the highest bids within the private value of the bidder. In a corresponding manner, the auction rules can be established to incentivized sellers to ask the minimum possible amount, above their reserve. For example, a portion of the surplus may be allocated to bidders in accordance with how close they come to the winning ask. Therefore, both incentives may be applied, for example with the surplus split in two, and half allocated to the bidder pool and half allocated to the seller pool. Clearly, other allocations or proportionations are possible.

The winning bidder and/or seller may be included within the rebate pool. This is particularly advantageous where for various reasons, the winning bidder is not selected. Thus, this process potentially decouples the bidding (auction) process and the resulting commercial transaction.

Because of transactional inefficiencies, human behavioral aspects, and a desire to avoid increased network overhead by "false" bidders seeking a share of the allocation pool without intending to win the auction, it may be useful to limit the allocation of the surplus pool to a subset of the bidders and/or sellers, for example the top three of one or both. This therefore encourages bidders and/or sellers to seek to be in the limited group splitting the pool, and thus incentivizes higher bids and lower asks. Of course, a party will have a much stronger incentive to avoid bidding outside its valuation bounds, so the risk of this type of inefficiency is small.

As discussed above, one embodiment of the invention provides a possible redistribution or wealth among nodes within a hierarchal chain. This redistribution may be of accumulated wealth, or of the generation function portion. Trading among hierarchally related parties is preferred, since the perceived cost is low, and the wealth can be repeatedly redistributed. In fact, it is because of the possibility of wealth oscillation and teaming that the declining wealth function is preferred, since this will tend to defeat closely related party control over the network for extended periods.

It is noted that, in a multihop mobile ad hoc network, if a communication path fails, no further transfers are possible, potentially resulting in stalled or corrupt system configuration. It is possible to transfer an expiring or declining portion of the generating function; however, this might lead a node which is out of range to have no ability to rejoin the network upon return, and thus act as an impediment to efficient network operation. Therefore, it is preferred that, in an artificial economy, each node has some intrinsic wealth generator function, so an extended period of inactivity, a node gains wealth likely sufficient to rejoin the network as a full participant.

In practice, in a typical military-type hierarchy, the bulk of the wealth generating function will be distributed to the lowest ranks with the highest numbers. Thus, under normal circumstances, the network will appear to operate according to a non-hierarchal (i.e., peer) model, with the distortion that not all nodes have a common generator function. On the other hand, hierarchically superior nodes either retain, or more likely, can quickly recruit surrounding subordinates to allocate their wealth generating function and accumulated wealth to pass urgent or valuable messages. Thus, if 85% of the wealth and network resources are distributed to the lowest-ranking members, then the maximum distortion due to hierarchal modifications is 15%.

One way that this allocation of wealth may be apparent is with respect to the use of expensive assets. Thus, a high level node might have access to a high power broadcast system or licensed spectrum, while low level nodes might ordinarily be limited to lower power transmission and/or unlicensed spectrum or cellular wireless communications. For a low level node to generate a broadcast using an expensive asset (or to allocate a massive amount of space-bandwidth product), it must pass the request up through the chain of command, until sufficient wealth (i.e., authority) is available to implement the broadcast.

In fact, such communications and authorizations are quite consistent with the expectations within a hierarchal organization, and this construct is likely to be accepted within a military-type hierarchal organization.

Under normal circumstances, a superior would have an incentive to assure that each subordinate node possesses sufficient wealth to carry out its function and be incentivized to participate in the network. If a subordinate has insufficient initial wealth (or wealth generating function) allocation, it may still participate, but it must expend its internal resources to obtain wealth for participation toward its own benefit. This, in turn, leads to a potential exhaustion of resources, and the unavailability of the node for ad hoc intermediary use, even for the benefit of the hierarchy. An initial surplus allocation will lead to overbidding for resources, and thus inefficient resource allocation, potential waste of allocation, and a disincentive to act as an intermediary in the ad hoc network. While in a traditional military hierarchy, cooperation can be mandated, in systems where cooperation is perceived as contrary to the net personal interests of the actor, network stability may be poor, and defection in spite of mandate.

In a military system, it is thus possible to formulate an "engineered" solution which forces participation and eliminates defection; however, it is clear that such solutions forfeit the potential gains of optimality, and incentivizes circumvention and non-compliance. Further, because such a system is not "cost sensitive" (however the appropriate cost function might be expressed), it fails to respond to "market" forces.

Accordingly, a peer to peer mobile ad hoc network suitable for respecting hierarchal organization structures is provided. In this hierarchal system, the hierarchy is represented by an initial wealth or wealth generation function distribution, and the hierarchally higher nodes can reallocate wealth of nodes beneath themselves, exercising their higher authority. This wealth redistribution can be overt or covert, and if overt, the hierarchal orders can be imposed without nodal assent. In a covert redistribution, trust may be required to assure redistribution by a node to a grandchild node.

The wealth and its distribution can be implemented using modified micropayment techniques and other verifiable cryptographic techniques. This wealth can be applied to auctions and markets, to allocate resources. Various aspects of this system are discussed in more detail elsewhere in this specification.

In accordance with aspects of this embodiment, an example is provided. In this scenario, a vehicle traveling along a highway seeks traffic information 10-20 miles ahead on the road. The transceiver in the vehicle has a range of about 0.5 miles, meaning that, assuming maximum hop range, 20-40 hope would be necessary in each direction in order to fulfill a response to a request for information. If we further assume that the traffic density allows an average density of compatible transceivers of 1 per 0.05 miles$^2$, then it would appear that for each hop, a number of intermediaries would be possible. We further assume that each vehicle has a pair of antennas (which may operate on different frequencies), forward and backward looking, so that forward And backward communications are non-interfering. It is noted that, in operation, it is not a single vehicle that seeks information responding to a request; rather, it is likely that 2-25% of vehicles will seek information within a short period, especially of the cost of fulfilling a request is relatively low. We also assume that there is no common trigger event, such as an accident, which would provoke essentially all vehicles to request the same information, a circumstances that could be addressed through a multicast or broadcast.

If the vehicle sought to arrange a communication over the entire 10-20 miles in advance of communicating, this would require a multifactorial optimization likely involving over 100 transceivers, and if even one of the 20-40 intermediates fails, the entire communication fails. The administrative overhead for this process may not outweigh its advantages.

On the other hand, if we instead presume that the vehicle only optimize a path over a limited range or number of hops, e.g., 1 mile or 5 hops, then the optimization is facilitated and the administrative overhead reduced. On the other hand, this requires that vehicles or nodes at the fringe arrange for completion of the communication. It is here that the statistical aspects of the network architecture may be exploited to achieve efficiencies. Thus, in observing or participating in the network activities over a period of time, a node can model the behavior of nearby nodes, and determine a degree of risk with respect to the model. That node may then undertake the risk associated with its assessment of its environment, and communicate an offer to act as agent for completion of the communication, without explicitly communicating the details of the communication. Therefore, the originating node optimizes a local region ad hoc network, and then adopts an estimate of the network state beyond the edge of the local region.

Economically, the vehicle seeking the information broadcasts a bid or value function of its valuation of the resources it requires. This bid is propagated to the local region or beyond, and compared with the bids or value functions of other vehicles or nodes. A winning vehicle or node then assumes control over the minimum temporal-spatial-frequency channel required. As stated above, at the edge of the local region, nodes may act as proxies or agents, and undertake the risk of the more distant communication, adding a risk premium to their ask. The node with the lowest ask is selected as the agent or proxy. It is noted that the role of communication intermediary and proxy or agent is discrete, and therefore need not be a single element, though certain efficiencies are gained if this is the case. The agent or proxy must also conduct an auction for the next stage of the communication, in a process which is repeated until the destination node is included within the local region.

The proxy or agent undertakes the risk of the cost of the downstream communications, as well as the risk of non-payment, and thus may well charge a substantial premium over its actual risk-free cost. Therefore, the efficiency gained through the use of the agent or proxy derives from the administrative efficiencies gained, as well as comprehension that the risks are inherent, and must generally be undertaken by some element of the network. The incrementally added risks may be small, but are transferred. A node which promotes itself for acting as agent or proxy may do so because it has lower risks, costs or otherwise unproductive assets. For example, a cellular telephone carrier may choose to participate in the network, using its fixed infrastructure as a backup, or bypass. In that case, if the network fails, or is less efficient, it has the option of using its own facilities.

The agent or proxy therefore arbitrages the risk, based on its own knowledge of its local region which is different from the local region of the originator of the communication. There may be less competition for the role of arbitrageur, allowing it to claim a larger portion of the economic surplus. In fact, an arbitrageur may pre-acquire resources at a defined price, and resell them later at a profit. Thus, it is seen that economic efficiencies and increased profits for intermediaries are not inconsistent, where opportunities for reduction in inefficiencies exist.

Adding hierarchal element to this example, it is noted that certain risks are reduced when transactions are conducted between related entities. For example, if their respective wealth is interlinked, over the long term, the risk of non-payment is abated. Likewise, the risk of defection or non-compliance is reduced. Further, since it is presumed that the benefit function of related nodes is intertwined, actual costs may be reduced, since the communication itself is a countervailing benefit to the cost of a related node conveying the message or packet. Thus, there will likely be a preference for communications between more closely related nodes than between more distantly related or unrelated nodes. On the other hand, since wealth (virtual or real) itself is desirable, and inter-party transactions limit wealth gain opportunities, there will also be an incentive to conduct transactions with unrelated nodes for full value. As discussed above, in a hierarchy, a top level node is initially allocated the entire wealth and/or wealth generation function for its subordinates, which is then redistributed as appropriate or desired. The top level node will generally not maintain more wealth than required, since this is inefficient, and redistributions incur their own inefficiencies.

The economy is preferably virtual, employing arbitrary value credits generated using a cryptographic function. One possible exception is where external elements, such as cellular telephone carriers, are integrated into the system. Since these are real economy agents, there must be some interchange in value between credits and cash, unless the cellular carrier gains a benefit from the ad hoc network. One such possible benefit is extension of its fixed infrastructure to serve under-covered areas. Another possible benefit is the ability to provide information from the ad hoc network to more remote areas. A further benefit is the ability to use unlicensed spectrum for its activities in a standard and non-interfering manner.

In the virtual economy, each node has a physically and/or logically secure cryptographic module, which sequentially generates values which have a unique index number, and may be verified as to node and time of origin, and possibly chain of owners. A node receiving this value can therefore verify that it is authentic, its time of creation (and therefore amortization schedule), and as an audit trail, the chain of ownership. Each bid is also cryptographically secure and signed, so that if a node places a bid, and later fails to pay, a later investigation can be conducted to correctly account for the transaction, and possibly penalize wrongdoing. The payments for a communication are communicated after the transaction, in a cryptographic wrapper (cryptolope) destined for a target node. Since these are secure, the opportunity for theft is low, and there is little incentive for intentional delay of transmission by any intermediate. Further, these packets may be transmitted along redundant paths, to limit the ability of any one node to disrupt communications.

The ability of a node to spend the same value packet twice is limited by a number of factors. First, since each node has a defined generator function, if its spending exceeds its generation capacity, this will be apparent to nearby nodes. Second, since each packet has an index value, the other nodes may compare these values to make sure that they are not used more than once by any node, before they are transferred to another node. Since the value of the credit declines in value over time, indefinite period monitoring is not required.

In some instances, saving value may be an efficient strategy. In order to take advantage of these gains, special bank nodes may be established which have the ability to hoard credits and then reissue new credits when required. Typically, there will be no interest, and in fact there may be discount and delay. The net result of promoting savings will typically be a reduction in demand with respect to supply, thus increasing availability of resources. By allowing withdrawal of savings, periods of inflation and high peak demand is possible. Further, if the withdrawn wealth has the same amortization schedule as newly generated credits, an event which provokes a "run on the bank" may result in a rapid diminution of saved wealth, unless the immediate recipients bank the newly transferred wealth.

As is seen, many of the economic institutions of the real economy have equivalents in the virtual economy, and therefore may be employed in their traditional and known roles to improve efficiency where the self-organizing features of the network alone incur corresponding inefficiencies, thus creating opportunities. Where necessary, links to a real economy, in order to pay for capital investment, efforts, or compensate for risks, may be employed, however it is preferred that these links be attenuated in order to isolate the bulk of the ad hoc network from the influence of real-economy node wealth, and therefore to promote defection of those nodes who are disadvantaged thereby.

Second Embodiment

Multihop Ad Hoc Networks require cooperation of nodes which are relatively disinterested in the content being conveyed. Typically, such disinterested intermediaries incur a cost for participation, for example, power consumption or opportunity cost. Economic incentives may be used to promote cooperation of disinterested intermediaries. An economic optimization may be achieved using a market price-finding process, such as an auction. In many scenarios, the desire for the fairness of an auction is tempered by other concerns, i.e., there are constraints on the optimization which influence price and parties of a transaction. For example, in military communication systems, rank may be deemed an important factor in access to, and control over, the communications medium. A simple process of rank-based preemption, without regard for subjective or objective importance, will result in an inefficient economic distortion. In order to normalize the application of rank, one is presented with two options: imposing a normalization scheme with respect to rank to create a unified economy, or considering rank using a set of rules outside of the economy. One way to normalize rank, and the implicit hierarchy underlying the rank, is by treating the economy as an object-oriented hierarchy, in which each individual inherits or is allocated a subset of the rights of a parent, with peers within the hierarchy operating in a purely economic manner. The extrinsic consideration of rank, outside of an economy, can be denominated "respect", which corresponds to the societal treatment of the issue, rather than normalizing this factor within the economy, in order to avoid unintended secondary economic distortion. Each system has its merits and limitations. An economic optimization is one involving a transaction in which all benefits and detriments can be expressed in normalized terms, and therefore by balancing all factors, including supply and demand, at a price, an optimum is achieved. Auctions are well known means to achieve an economic optimization between distinct interests, to transfer a good or right in exchange for a market price. While there are different types of auctions, each having their limitations and attributes, as a class these are well accepted as a means for transfer of goods or rights at an optimum price. Where multiple goods or rights are required in a sufficient combination to achieve a requirement, a so-called Vickrey-Clarke-Groves (VCG) auction may be employed. In such an auction, each supplier asserts a desired price for his component. The various combinations which meet the requirement are then compared, and the lowest cost combination selected. In a combinatorial supply auction, a plurality of buyers each seeks a divisible commodity, and each bids its best price. The bidders with the combination of prices which are maximum are selected. In a commodity market, there are a plurality of buyers and sellers, so the auction is more complex. In a market economy, the redistribution of goods or services is typically transferred between those who value them least to those who value them most. The transaction price depends on the balance between supply and demand; with the surplus being allocated to the limiting factor.

There has thus been shown and described novel communications devices and systems and methods which fulfill all the objects and advantages sought therefore. Many changes, modifications, variations, combinations, subcombinations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method of optimizing relationships between a set of agents with respect to a set of allocable resources, at least one of the set of allocable resources having an associated risk, comprising:
    (a) for a plurality of agents, determining at least one of a subjective resource value function, and a subjective risk tolerance value function;
    (b) providing at least one resource allocation mechanism, wherein a resource may be allocated on behalf of an agent in exchange for value;
    (c) providing at least one risk transference mechanism, wherein a risk associated with a resource, independent of the respective associated allocable resource, may be transferred from one agent to another agent in exchange for value;
    (d) selecting, using at least one automated processor, in a unitary optimization process, an optimal allocation of resources and assumption of risk by maximizing, within an error limit, an aggregate economic surplus of the putative organization of agents;
    (e) accounting for the allocation of resources and allocation of risk in accordance with the subjective resource value function and a subjective risk tolerance value function for the selected optimal allocation; and
    (f) allocating resources and risk in accordance with the selected optimal organization,
    wherein a portion of an optimal allocation of resources comprises allocable resources being undertaken by a risk transference agent which is not a consumer of the allocable resources and is not an originator of the allocable resources.

2. The method according to claim 1, wherein a resource comprises a communication opportunity.

3. The method according to claim 1, wherein an agent has a subjective resource value for failing to gain an allocation of a resource.

4. The method according to claim 1, wherein an agent has an option to defect from the organization.

5. The method according to claim 1, wherein an agent has multipart resource requirement, wherein an optimal resource allocation requires allocation of a plurality of resource components.

6. The method according to claim 1, wherein a risk transference agent insures a risk.

7. The method according to claim 1, wherein a risk transference agent arbitrages a risk.

8. The method according to claim 1, wherein the optimal resource allocation comprises an explicit allocation of a first portion of component resources and an implicit allocation of a second portion of component resources, a risk transference agent undertaking to fulfill the second portion.

9. The method according to claim 1, wherein a risk transference agent speculatively acquires resources.

10. A method of optimizing an allocation of resources and deference from contesting the allocation of resources to other agents, comprising:
    (a) determining both a subjective resource value function, and a subjective deference value function for an agent with respect to a resource allocation within a community;
    (b) selecting, using at least one automated processor, a unitary optimal allocation of resources and deference by maximizing, within an error limit, an aggregate economic surplus of the community;
    (c) allocating resources in accordance with the selected optimal organization; and
    (d) accounting in accordance with the subjective resource value function, and subjective deference value function.

11. A non-transitory computer readable medium storing instructions adapted to control an automated processor to perform a method of optimizing relationships between a set of agents with respect to a set of allocable resources, at least one of the set of allocable resources having an associated risk, comprising:
    (a) determining at least one of a subjective resource value function, and a subjective risk tolerance value function of an agent associated with a resource, independent of the respective associated allocable resource;
    (b) interfacing with at least one resource allocation mechanism, wherein a resource may be allocated on behalf of the agent in exchange for value;
    (c) interfacing with at least one risk transference mechanism, wherein a risk may be transferred, independent of an associated resource, from the agent to another agent in exchange for value;
    (d) selecting, in a unitary process, an optimal allocation of resources and assumption of risk by engaging in a maximization, within an error limit, of an aggregate economic surplus of the putative organization of agents;
    (e) accounting for the allocation of resources and allocation of risk in accordance with the subjective resource value function and a subjective risk tolerance value function for the selected optimal allocation; and
    (f) allocating resources and risk in accordance with the selected optimal organization,
    wherein a portion of an optimal allocation of resources comprises allocable resources being undertaken by a risk transference agent which is not a consumer of the allocable resources and is not an originator of the allocable resources.

12. The non-transitory computer readable medium according to claim 11, wherein a resource comprises a communication opportunity.

13. The non-transitory computer readable medium according to claim 11, wherein the set of agents comprises at least one of a risk transference agent which insures a risk, and a risk transference agent which arbitrages a risk, on behalf of the agent.

14. The non-transtory computer readable medium according to claim 13, wherein the optimal resource allocation comprises an explicit allocation of a first portion of component resources and an implicit allocation of a second portion of component resources, and the risk transference agent undertakes to fulfill the second portion.

15. A non-transitory computer readable medium storing instructions adapted to control at least one automated processor to perform a method of optimizing an allocation of resources and deference from contesting the allocation of resources to other agents by agents with a positive utility for at least one resource at an allocation value, comprising:
    (a) determining a subjective resource value function, and a subjective deference value function for an agent with respect to a resource allocation within a community;

(b) selecting an optimal allocation of resources and deference by maximizing, within an error limit, an aggregate economic surplus of the community;
(c) allocating resources in accordance with the selected optimal organization; and
(d) accounting in accordance with the subjective resource value function, and subjective deference value function.

16. A method of routing a communication, comprising:

defining a set of available communication resources, each being associated with an inclusion cost for a communication function;

defining an acceptable risk tolerance to a principal that a network topology comprising a plurality of communication resources will successfully perform a communication function, and an acceptable aggregate communications cost to the principal for the at least one available communication resource;

defining a network topology comprising a plurality of communication resources, having a respective communications cost within the acceptable aggregate communications cost;

transferring at least a portion of a risk that the plurality of communications resources will successfully perform the communication function from the principal to a risk transference agent;

performing the communication function in accordance with the network topology through at least one communication device; and if the network topology fails to successfully perform the communication function, accounting for the at least a portion of the transferred risk between the risk transference agent and the principal, wherein the risk transference agent does not consume the at least one communication resource, and the at least a portion of the risk that the plurality of communications resources will successfully perform the communication function is transferred from the principal to the risk transference agent independent of the defined network topology.

17. The method according to claim 16, wherein a plurality of principals compete in an auction for allocation of at least one communication resource.

18. The method according to claim 16, further comprising compensating, by the principal to the risk transference agent, for a transferred risk such that a sum of an actual communications cost and a risk transference cost is less than or equal to the acceptable aggregate cost, and a residual risk maintained by the principal is less than or equal to the acceptable risk tolerance.

19. The method according to claim 18, wherein a plurality of principals compete in an auction for allocation of at least one communication resource based on an auction bid from each principal, the bid price from each principal being less than or equal to a respective principal's acceptable aggregate cost, at least one auction bid being dependent on a risk transference cost.

* * * * *

UNITED STATES PATENT AND TRADEMARK OFFICE
CERTIFICATE OF CORRECTION

PATENT NO. : 8,144,619 B2
APPLICATION NO. : 12/089277
DATED : March 27, 2012
INVENTOR(S) : Hoffberg It is certified that error appears in the above-identified patent and that said Letters Patent is hereby corrected as shown below:

On the Cover Page, in Field (57), under "ABSTRACT", in Column 2, Lines 3 and 7 delete "hierarchal" and insert -- hierarchical --, therefor at each occurrence throughout the patent.

On the Cover Page, in Field (57), under "ABSTRACT", in Column 2, Line 4, delete "at the a high" and insert -- at a high --, therefor.

In Column 2, Line 5, delete "ww." and insert -- www. --, therefor.

In Column 2, Line 59, delete "of he" and insert -- of the --, therefor.

In Column 5, Line 1, delete "644-648." and insert -- 644-648, --, therefor.

In Column 5, Line 61, delete "Eurecom" and insert -- Eurécom --, therefor.

In Column 7, Line 51, delete "is top" and insert -- is to --, therefor.

In Column 9, Line 35, delete "DESCRIPTION" and insert -- DETAILED DESCRIPTION --, therefor.

In Column 13, Line 39, delete "other and," and insert -- other hand, --, therefor.

In Column 15, Line 34, delete "(or hierarchally)" and insert -- (or hierarchically) --, therefor.

In Column 22, Line 24, delete "i.e." and insert -- i.e., --, therefor.

In Column 27, Line 51, delete "may" and insert -- many --, therefor.

In Column 30, Line 34, delete "html;" and insert -- html); --, therefor.

Signed and Sealed this
Fourteenth Day of August, 2012

David J. Kappos
*Director of the United States Patent and Trademark Office*

CERTIFICATE OF CORRECTION (continued)
U.S. Pat. No. 8,144,619 B2

In Column 40, Line 11, delete "redistribution or wealth" and insert -- redistribution of wealth --, therefor.

In Column 40, Line 14, delete "hierarchally" and insert -- hierarchically --, therefor.

In Column 41, Line 21, delete "hierarchally" and insert -- hierarchically --, therefor.

In Column 41, Line 45, delete "And" and insert -- and --, therefor.

In Column 46, Line 53, in Claim 14, delete "non-transtory" and insert -- non-transitory --, therefor.